US007660867B2

(12) United States Patent
Sakuta

(10) Patent No.: US 7,660,867 B2
(45) Date of Patent: Feb. 9, 2010

(54) VIRTUAL COMPUTER SYSTEM AND VIRTUAL COMPUTER MIGRATION CONTROL METHOD

(75) Inventor: Hiroshi Sakuta, Nagaizumi (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 12/022,432

(22) Filed: Jan. 30, 2008

(65) Prior Publication Data

US 2009/0144389 A1 Jun. 4, 2009

(30) Foreign Application Priority Data

Dec. 4, 2007 (JP) ............................. 2007-313284

(51) Int. Cl.
*G06F 15/167* (2006.01)
(52) U.S. Cl. ...................... 709/215; 709/220
(58) Field of Classification Search ............ 709/215, 709/220
See application file for complete search history.

(56) References Cited

U.S. PATENT DOCUMENTS 6,802,062 B1  10/2004  Oyamada et al.

FOREIGN PATENT DOCUMENTS

JP  10-283210  10/1998

*Primary Examiner*—Tammy T Nguyen
(74) *Attorney, Agent, or Firm*—Brundidge & Stanger, P.C.

(57) ABSTRACT

A migration source virtual server and a migration destination virtual server respectively include a volume information management unit for associating and managing volume identifying information for identifying the logical volumes and the logical volumes managed by the management OS of the migration source virtual server and the management OS of the migration destination virtual server; an identification unit for the migration source virtual server and the migration destination virtual server to identify the same logical volume as a target logical volume based on the volume identifying information; and a virtual OS migration unit for migrating data in an memory area used by a virtual OS of the migration source virtual server to the migration destination virtual server, and migrating update data in the memory area to be updated during the migration to the migration destination virtual server.

6 Claims, 40 Drawing Sheets

MEMORY DIFFERENTIAL MANAGEMENT TABLE

| GUEST OS IDENTIFYING INFORMATION (2120) | MEMORY DIFFERENTIAL SEQUENTIAL NUMBER (2121) | CHANGED ADDRESS (2122) |
|---|---|---|
| GUEST OS1 | 0001 | 08005200 |
| GUEST OS2 | 0002 | 06103301 |

VOLUME ALLOCATION TABLE

| GUEST OS IDENTIFYING INFORMATION (2100) | MANAGEMENT OS VOLUME NAME (2101) | GUEST OS VOLUME NAME (2102) |
|---|---|---|
| GUEST OS1 | VOLUME 1 | VOLUME a |
| GUEST OS1 | VOLUME 2 | VOLUME b |
| GUEST OS2 | VOLUME 3 | VOLUME a |
| GUEST OS3 | VOLUME 4 | VOLUME a |

MEMORY AREA MANAGEMENT TABLE

| GUEST OS IDENTIFYING INFORMATION (2110) | MEMORY AREA START ADDRESS (2111) | MEMORY AREA END ADDRESS (2112) |
|---|---|---|
| GUEST OS1 | 05200100 | 09003020 |
| GUEST OS2 | 09004000 | 15018000 |
| GUEST OS3 | 15019000 | 29105000 |

MEMORY DIFFERENTIAL MANAGEMENT TABLE

| GUEST OS IDENTIFYING INFORMATION | MEMORY DIFFERENTIAL SEQUENTIAL NUMBER | CHANGED ADDRESS |
|---|---|---|
| GUEST OS1 | 0001 | 08005200 |
| GUEST OS2 | 0002 | 06103301 |

VOLUME INFORMATION MANAGEMENT TABLE

| VOLUME MANAGEMENT NUMBER | MANAGEMENT OS VOLUME NAME | STORAGE APPARATUS SERIAL NUMBER | VOLUME IDENTIFYING INFORMATION | REMOTE-SIDE MANAGEMENT OS IDENTIFYING INFORMATION |
|---|---|---|---|---|
| 0001 | VOLUME 1 | 80161 | 00:03:01 | 192.168.0.2 |
| 0002 | VOLUME 2 | 80161 | 00:03:02 | 192.168.0.2 |

213

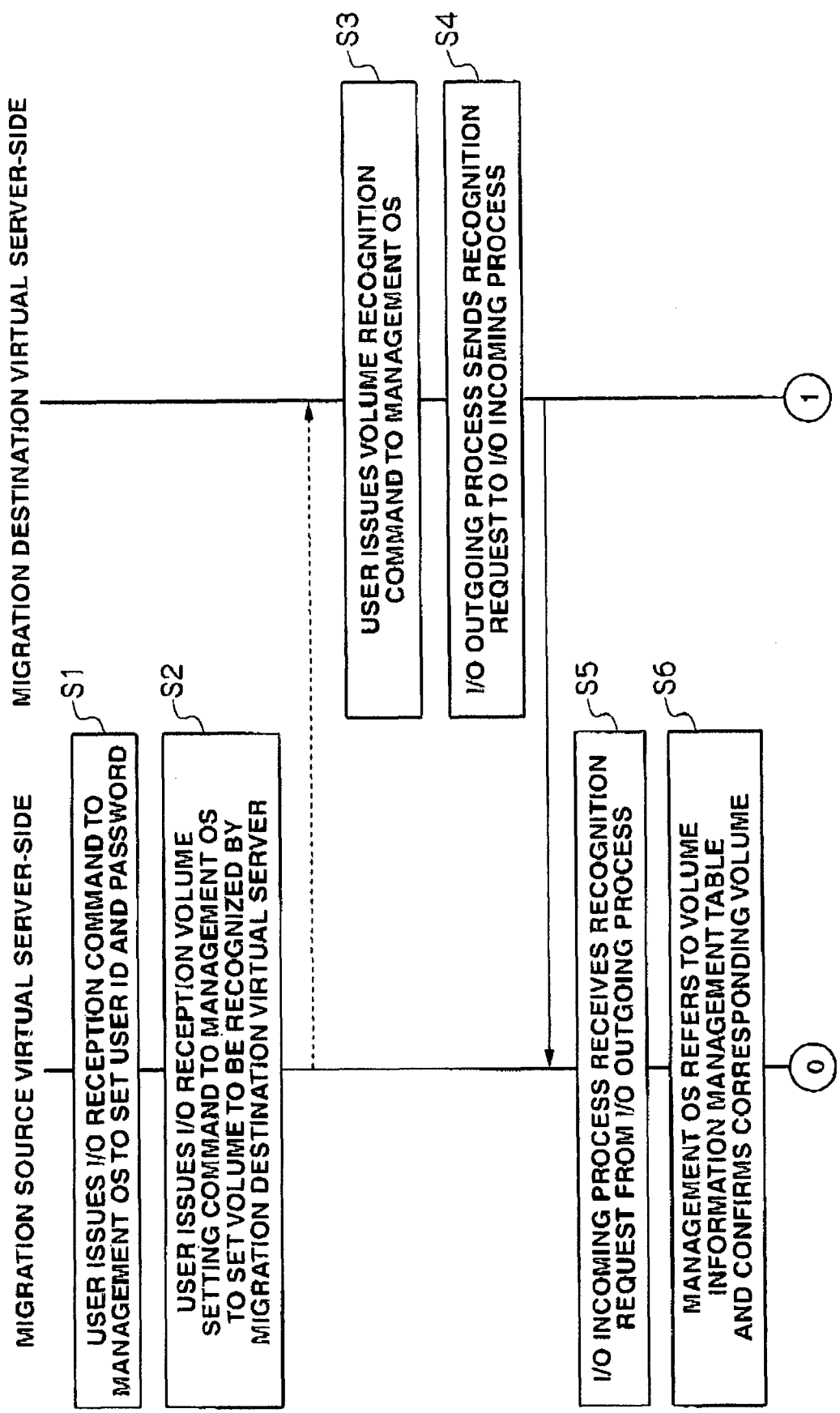

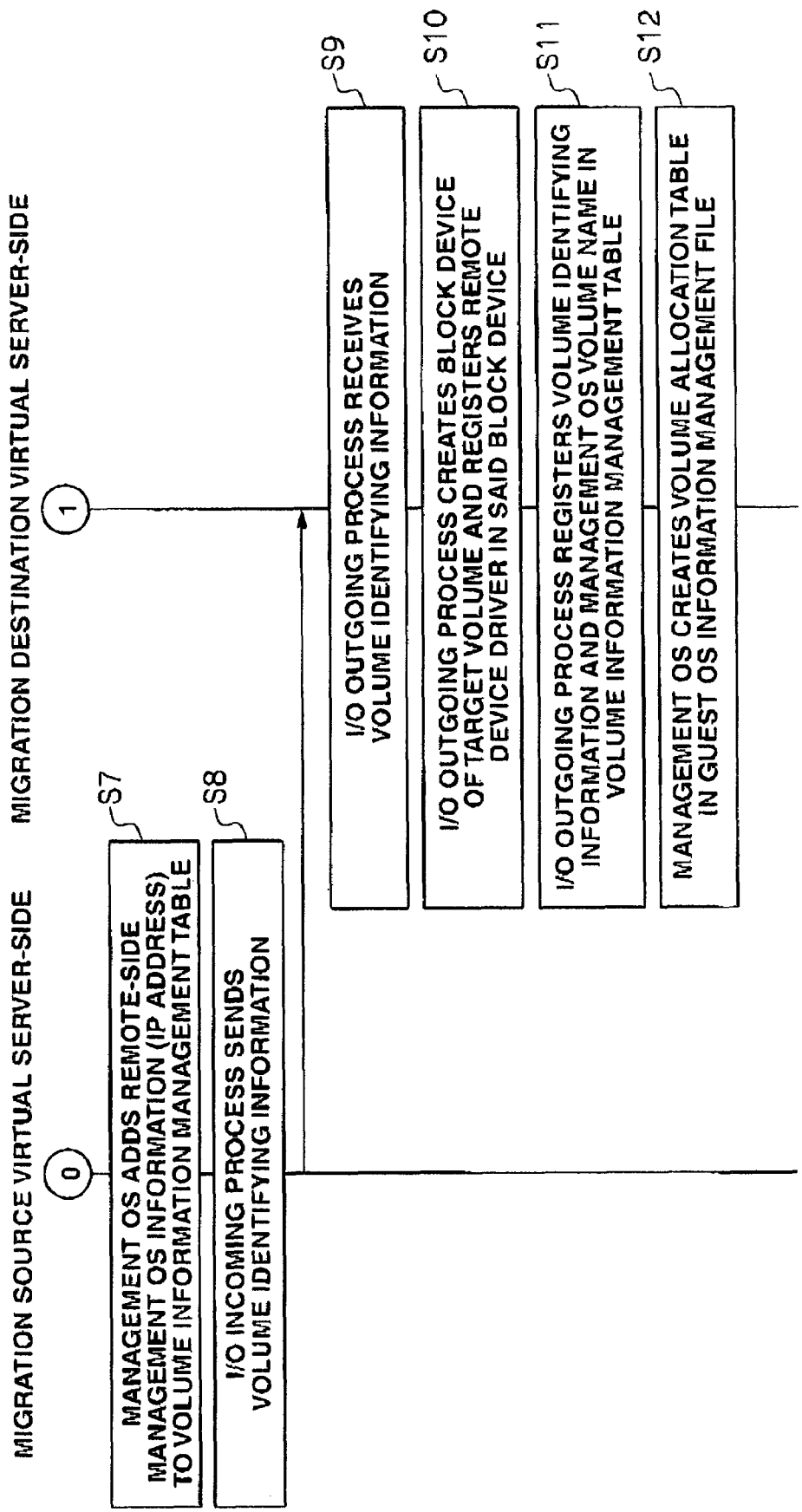

FIG.13

| VOLUME NAME (100D) | STORAGE APPARATUS SERIAL NUMBER (101D) | VOLUME IDENTIFYING INFORMATION (102D) | REMOTE/LOCAL VOLUME IDENTIFYING INFORMATION (103D) | REMOTE-SIDE MANAGEMENT OS IDENTIFYING INFORMATION (104D) |
|---|---|---|---|---|
| VOLUME 1 | 80161 | 00:03:01 | export | 192.168.0.2 |
| VOLUME 2 | 80161 | 00:03:02 | export | 192.168.0.2 |

| VOLUME NAME 200D | STORAGE APPARATUS SERIAL NUMBER 201D | VOLUME IDENTIFYING INFORMATION 202D | REMOTE/LOCAL VOLUME IDENTIFYING INFORMATION 203D | REMOTE-SIDE MANAGEMENT OS IDENTIFYING INFORMATION 204D |
|---|---|---|---|---|
| VOLUME 21 | 80161 | 00:03:01 | import | 192.168.0.1 |
| VOLUME 22 | 80161 | 00:03:02 | import | 192.168.0.1 |

FIG.18

I/O OUTGOING PROCESS→I/O INCOMING PROCESS DURING READ REQUEST

| SEQUENTIAL NUMBER | STORAGE APPARATUS SERIAL NUMBER | VOLUME IDENTIFYING INFORMATION | SCSI COMMAND (READ COMMAND) | READ DATA ADDRESS | DATA LENGTH OF READ DATA | |
|---|---|---|---|---|---|---|
| R0 | R1 | R2 | R3 | R4 | R5 | |

FIG.19

I/O INCOMING PROCESS→ I/O OUTGOING PROCESS DURING READ REQUEST

| SEQUENTIAL NUMBER | STORAGE APPARATUS SERIAL NUMBER | VOLUME IDENTIFYING INFORMATION | SCSI COMMAND (READ COMMAND) | READ DATA ADDRESS | DATA LENGTH OF READ DATA | READ DATA |
|---|---|---|---|---|---|---|
| R0 | R1 | R2 | R3 | R4 | R5 | R6 |

FIG.22

I/O OUTGOING PROCESS→I/O INCOMING PROCESS DURING WRITE REQUEST

| SEQUENTIAL NUMBER | STORAGE APPARATUS SERIAL NUMBER | VOLUME IDENTIFYING INFORMATION | SCSI COMMAND (WRITE COMMAND) | WRITE DATA ADDRESS | DATA LENGTH OF WRITE DATA | WRITE DATA |
|---|---|---|---|---|---|---|
| W0 | W1 | W2 | W3 | W4 | W5 | W6 |

FIG.25

I/O INCOMING PROCESS → I/O OUTGOING PROCESS DURING WRITE REQUEST

| SEQUENTIAL NUMBER | STORAGE APPARATUS SERIAL NUMBER | VOLUME IDENTIFYING INFORMATION | SCSI COMMAND (WRITE COMMAND) | WRITE DATA ADDRESS | WRITE RESULT (SUCCESS = DATA LENGTH; FAILURE = NUMBER OF NEGATIVES) |
|---|---|---|---|---|---|
| W0 | W1 | W2 | W3 | W4 | W7 |

FIG.28

COPY PAIR MANAGEMENT TABLE

| COPY PAIR MANAGEMENT NUMBER (2140) | VOLUME NAME OF COPY DESTINATION VOLUME (2141) | VOLUME NAME OF COPY SOURCE VOLUME (2142) |
|---|---|---|
| 0001 (COPY PAIR 1) | VOLUME 5 | DIFFERENTIAL MANAGEMENT VOLUME 1 |
| 0002 (COPY PAIR 2) | VOLUME 6 | DIFFERENTIAL MANAGEMENT VOLUME 2 |

COPY DIFFERENTIAL MANAGEMENT TABLE

| COPY PAIR MANAGEMENT NUMBER (2150) | SERIAL NUMBER OF DIFFERENTIAL DATA (2151) | TOP BLOCK ADDRESS OF DIFFERENTIAL DATA (2152) |
|---|---|---|
| 0001 | 00000001 | 002012340000 |
| 0001 | 00000002 | 002056780000 |
| 0002 | 00000001 | 006022220000 |
| 0002 | 00000002 | 006055660000 |
| 0002 | 00000003 | 006011110000 |

FLAG TABLE

| I/O RETENTION COMMAND FLAG (2160) | VOLUME SWITCH COMMAND FLAG (2161) | TIMEOUT FLAG (2162) | VOLUME SWITCHED FLAG (2163) |
|---|---|---|---|
| 0 | 0 | 0 | 0 |

216

VIRTUAL COMPUTER SYSTEM AND VIRTUAL COMPUTER MIGRATION CONTROL METHOD

CROSS REFERENCES

This application relates to and claims priority from Japanese Patent Application No. 2007-313284, filed on Dec. 4, 2007, the entire disclosure of which is incorporated herein by reference.

BACKGROUND

The present invention generally relates to a virtual computer system and a virtual computer migration method, and in particular relates to a virtual computer system that uses a virtual server loaded with a plurality of virtual OSes (Operation Systems).

Conventionally, virtual machine technology of virtualizing server hardware and operating a virtual OS in such virtual hardware is known. In this virtual machine technology, a plurality of virtual hardware devices are prepared and a virtual server capable of simultaneously operating a plurality of virtual OSes is used. Under ordinary circumstances, since a plurality of OSes to be operated respectively in a plurality of servers can be integrated as a plurality of virtual OSes in a virtual server, server operation costs can be reduced.

In addition, with the virtual machine technology as disclosed in Japanese Patent Laid-Open Publication No. 10-283210, a live migration function of migrating a virtual OS operating in one virtual server to the other virtual server is also being developed. With the live migration function, even if one virtual server is in the middle of reading or writing data, the virtual OS can be migrated to the other virtual server.

Meanwhile, when using a storage apparatus to store data, there is a method of managing a plurality of hard disks according to a RAID (Redundant Array of Independent/Inexpensive Disks) format. Here, at least one or more logical volumes (hereinafter simply referred to as "volumes") are formed in a physical storage area provided by a plurality of hard disks.

SUMMARY

A virtual server and a storage apparatus are connected via a SAN (Storage Area Network) as one of the high-speed networks. Nevertheless, if both virtual servers are in separate SAN environments because one virtual server and the other virtual server are installed at distant locations or other reasons, there is a problem in that the virtual OS operating in one virtual server cannot be migrated to the other virtual server.

In addition, under such separate SAN environments, one virtual server is not able to share the volumes in the storage apparatus connected to the other virtual server.

Thus, an object of the present invention is to propose a virtual computer system and a virtual computer migration control method enabling live migration of a virtual server even in cases where volumes of storage apparatuses cannot be shared due to separate SAN environments.

In order to achieve the foregoing object, the present invention provides a virtual computer system comprising a migration source virtual server and a migration destination virtual server having one or more virtual OSes and a management OS for managing the one or more virtual OSes, and a plurality of storage apparatuses having a plurality of logical volumes provided by a storage area in a hard disk for storing data from the management server. The migration source virtual server and the migration destination virtual server are mutually connected via a first network, the migration source virtual server is connected to the storage apparatus via a second network, and the migration destination virtual server is connected to another storage apparatus via a third network. The migration source virtual server and the migration destination virtual server respectively include a volume allocation unit for allocating the logical volumes managed by the management OS of the migration source virtual server and the management OS of the migration destination virtual server, and the logical volumes managed by the respective virtual OSes, a volume information management unit for associating and managing volume identifying information for identifying the logical volumes and the logical volumes managed by the management OS of the migration source virtual server and the management OS of the migration destination virtual server, an identification unit for the migration source virtual server and the migration destination virtual server to identify the same logical volume as a target logical volume based on the volume identifying information, and a virtual OS migration unit for migrating data in an memory area used by a virtual OS of the migration source virtual server to the migration destination virtual server, and migrating update data in the memory area to be updated during the migration to the migration destination virtual server.

Consequently, both virtual servers are able to share volumes of storage apparatuses even in separate network environments, and the virtual OS can be migrated from one virtual server to the other virtual server.

The present invention additionally provides a virtual computer migration control method of a virtual computer system comprising a migration source virtual server and a migration destination virtual server having one or more virtual OSes and a management OS for managing the one or more virtual OSes, and a plurality of storage apparatuses having a plurality of logical volumes provided by a storage area in a hard disk for storing data from the management server. The migration source virtual server and the migration destination virtual server are mutually connected via a first network, the migration source virtual server is connected to the storage apparatus via a second network, and the migration destination virtual server is connected to another storage apparatus via a third network. The virtual computer migration control method comprises a volume allocation step for allocating the logical volumes managed by the management OS of the migration source virtual server and the management OS of the migration destination virtual server, and the logical volumes managed by the respective virtual OSes, a volume information management step for associating and managing volume identifying information for identifying the logical volumes and the logical volumes managed by the management OS of the migration source virtual server and the management OS of the migration destination virtual server, an identification step for the migration source virtual server and the migration destination virtual server to identify the same logical volume as a target logical volume based on the volume identifying information, and a virtual OS migration step for migrating data in an memory area used by a virtual OS of the migration source virtual server to the migration destination virtual server, and migrating update data in the memory area to be updated during the migration to the migration destination virtual server.

Consequently, both virtual servers are able to share volumes of storage apparatuses even in separate network environments, and the virtual OS can be migrated from one virtual server to the other virtual server.

According to the present invention, live migration of a virtual server can be executed even in cases where volumes of storage apparatuses cannot be shared due to separate SAN environments.

DESCRIPTION OF DRAWINGS

FIG. 4 is a chart showing a volume allocation table according to the first embodiment;

FIG. 5 is a chart showing a memory area management table according to the first embodiment;

FIG. 6 is a chart showing a memory differential management table according to the first embodiment;

FIG. 7 is a chart showing a volume information management table according to the first embodiment;

FIG. 8 is a flowchart showing volume recognition processing according to the first embodiment;

FIG. 9 is a flowchart showing volume recognition processing according to the first embodiment;

FIG. 13 is a monitor screen of a migration source virtual server according to the first embodiment;

FIG. 14 is a monitor screen of a migration destination virtual server according to the first embodiment;

FIG. 18 is an explanatory diagram explaining a command issued during a read request according to the first embodiment;

FIG. 19 is an explanatory diagram explaining a command issued during a read request according to the first embodiment;

FIG. 22 is an explanatory diagram explaining a command issued during a write request according to the first embodiment;

FIG. 25 is an explanatory diagram explaining a command issued during a write request according to the first embodiment;

FIG. 28 is a chart showing a copy pair management table according to the second embodiment;

FIG. 29 is a chart showing a copy differential management table according to the second embodiment;

FIG. 30 is a chart showing a flag table according to the second embodiment;

DETAILED DESCRIPTION

An embodiment of the present invention is now explained, in detail with reference to the attached drawings.

Figure 1:
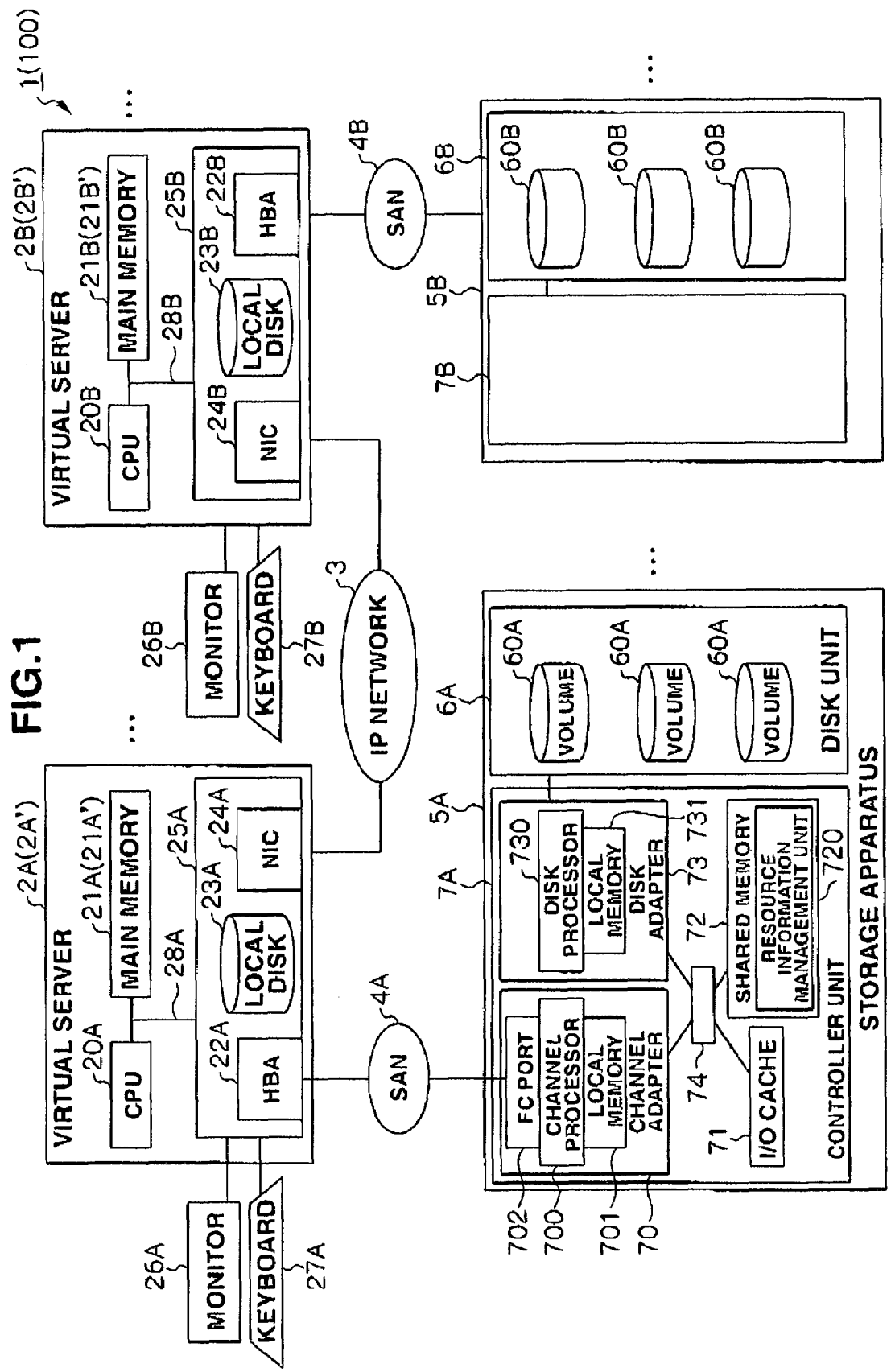
FIG. 1 is a block diagram showing the hardware configuration of a virtual computer system according to the first embodiment of the present invention.

(1) First Embodiment (1-1) Configuration of Virtual Computer System in First Embodiment (1-1-1) Hardware Configuration of Virtual Computer System FIG. 1 shows the overall virtual computer system 1 according to the present embodiment. The virtual computer system 1 is configured by a plurality of virtual servers 2A, 2B being connected via an IP (Internet Protocol) network 3, the virtual server 2A being connected to a storage apparatus 5A via a first SAN 4A, and the virtual server 2B being connected to an apparatus 5B via a second SAN 4B.

The virtual servers 2A, 2B are respectively connected to separate SANs 4A, 4B. Thus, although "A" and "B" will be indicated when it is necessary to differentiate the virtual servers, the explanation will be provided without indicating "A" and "B" when it is not necessary to differentiate the virtual servers. The same applies to the SANs 4A, 4B and the storage apparatuses 5A, 5B.

The virtual server 2 is a computer system comprising information processing resources such as a CPU (Central Processing Unit) 20 and a main memory 21, and, for instance, is configured from a personal computer, a workstation, a mainframe, or the like. The virtual server 2 also comprises hardware 25 such as an HBA (Host Bus Adapter) 22 as a connection interface with the storage apparatus 5, a local disk 23 for storing data in the virtual server 2, and an NIC (Network Interface Card) 24 as a connection interface with another virtual server 2.

The hardware 25 is connected to information I/O devices such as a monitor 26 and a keyboard 27 for performing operations of the virtual server 2. The CPU 20, the main memory 21, and the hardware 25 are connected via a bus 28.

Figure 2:
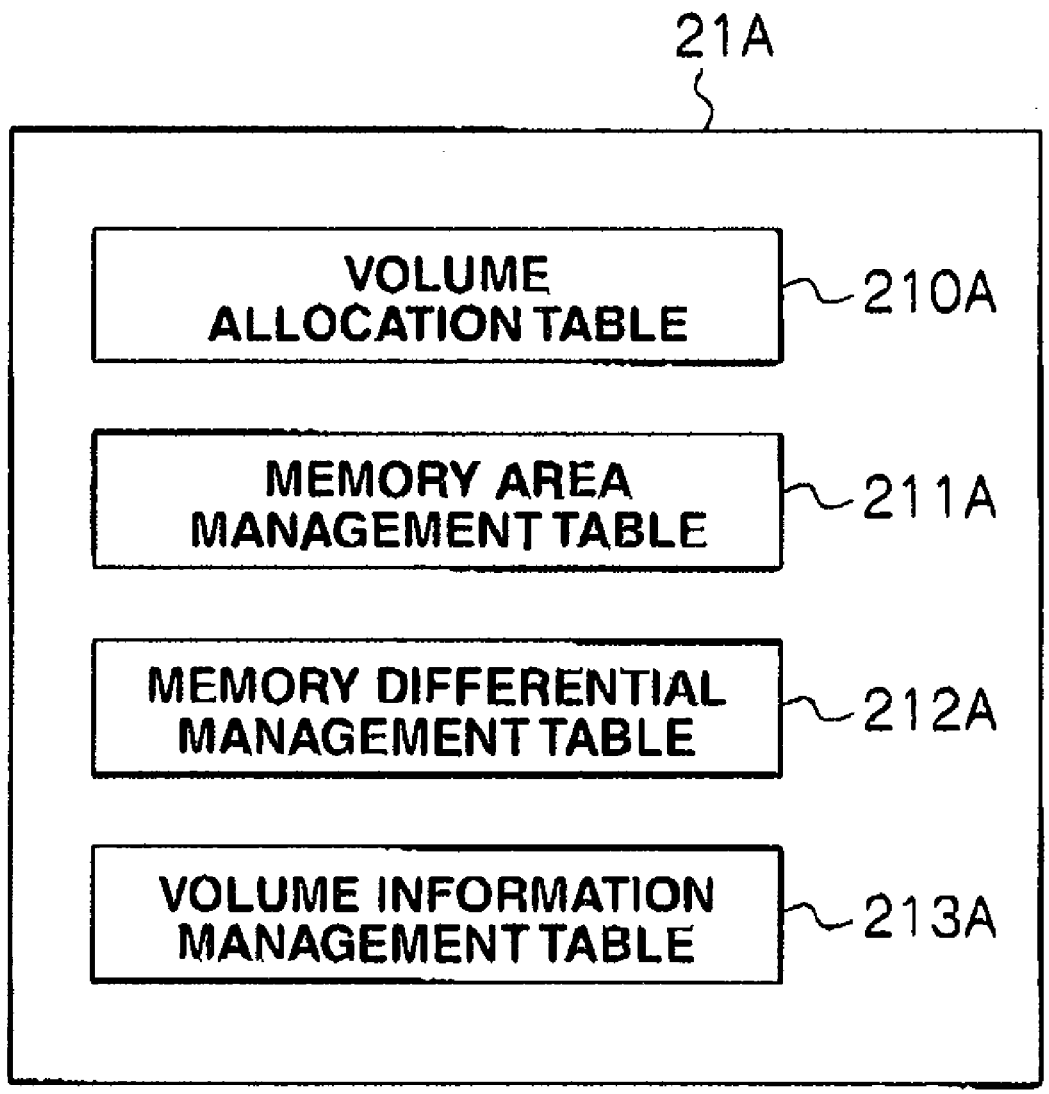
FIG. 2 is a chart showing the contents of a main memory according to the first embodiment.

As shown in FIG. 2, the main memory 21 of the virtual server 2 stores a volume allocation table 210, a memory area management table 211, a memory differential management table 212, and a volume information management table 213 described later. Incidentally, although FIG. 2 shows the main memory 21A of the migration source virtual server 2A, the migration destination virtual server 2B is also configured the same.

As shown in FIG. 1, one or more storage apparatuses 5 are provided, and each storage apparatus 5 is configured from a disk unit 6 including a plurality of volumes 60, and a controller unit 7 for managing the plurality of volumes 60 in RAID format.

The disk unit 6 is configured from a plurality of hard disks (not shown) that form a plurality of volumes 60. The hard disks, for example, are configured from expensive disks such as SCSI (Small Computer System Interface) disks or inexpensive disks such as SATA (Serial AT Attachment) disks or optical disks.

The volumes 60 are respectively allocated with a unique identifier (LUN: Logical Unit Number). The input and output of data is conducted by setting the combination of this identifier and a unique number (LBA: Logical Block Address) allocated to the respective blocks as the address, and designating such address.

The controller unit 7 is configured by a channel adapter 70, an I/O (Input/Output) cache 71, a shared memory 72, and a disk adapter 73 being connected via a switch 74.

The channel adapter 70 is configured as a microcomputer system comprising a channel processor 700, a local memory 701 and a communication interface, and comprises an FC (Fibre Channel) port 702 for connecting to the SAN 4. The channel adapter 70 interprets various commands sent from the virtual server 2 and executes necessary processing. The FC port 702 of the channel adapter 70 is allocated with a network address (for instance, a WWN) for respectively identifying the channel adapters 70, and the channel adapters 7 are thereby able to independently function as a NAS (Network Attached Storage).

The I/O cache 71 is a storage memory to be shared by the channel adapter 70 and the disk adapter 73. The I/O cache 71 is primarily used for temporarily storing data of the virtual server 2 that inputs and outputs data to and from the storage apparatus 5.

The shared memory 72 is a storage memory to be shared by the channel adapter 70 and the disk adapter 73. The shared memory 72 is primarily used for storing system configuration information and various control programs read from the system volume when the power of the storage apparatus 5 is turned on and commands from the virtual server 2. The shared memory 72 comprises a resource information management unit 720 for managing a plurality of volumes 60 in the disk unit 6.

The disk adapter 73 is configured as a microcomputer system comprising a disk processor 730, a local memory 731 and the like, and functions as an interface for performing protocol control during the communication with the disk unit 6. The disk adapter 73, for instance, is connected to the corresponding disk unit 6 via a fibre channel cable, and sends and receives data to and from the disk unit 6 according to a fibre channel protocol.

The sending and receiving of data and commands among the channel adapter 70, the I/O cache 71, the shared memory 72 and the disk adapter 73 is conducted via a switch 74. The switch 74, for example, is configured as a switch such as an ultrafast crossbar switch or a bus for performing data transfer by way of high-speed switching.

Like this, with the virtual computer system 1 according to the present embodiment, the configuration is such that the respective virtual servers 2A, 2B are respectively connected to separate storage apparatuses 5A, 5B via separate SANs 4A, 4B. Thus, the virtual server 2B is in an environment where it is not able to share the volumes 60 formed in the storage apparatus 5A connected to the virtual server 2A. The invention of this embodiment is characterized in executing migration (live migration) of a virtual OS between virtual servers under the foregoing environment.

(1-1-2) Software Configuration of Virtual Server

The software configuration of the virtual server 2 is now explained. Below, the migration source virtual server having the virtual OS to be migrated is explained as the virtual server 2A, and the migration destination virtual server having the virtual OS after migration is explained as the virtual server 2B.

Figure 3:
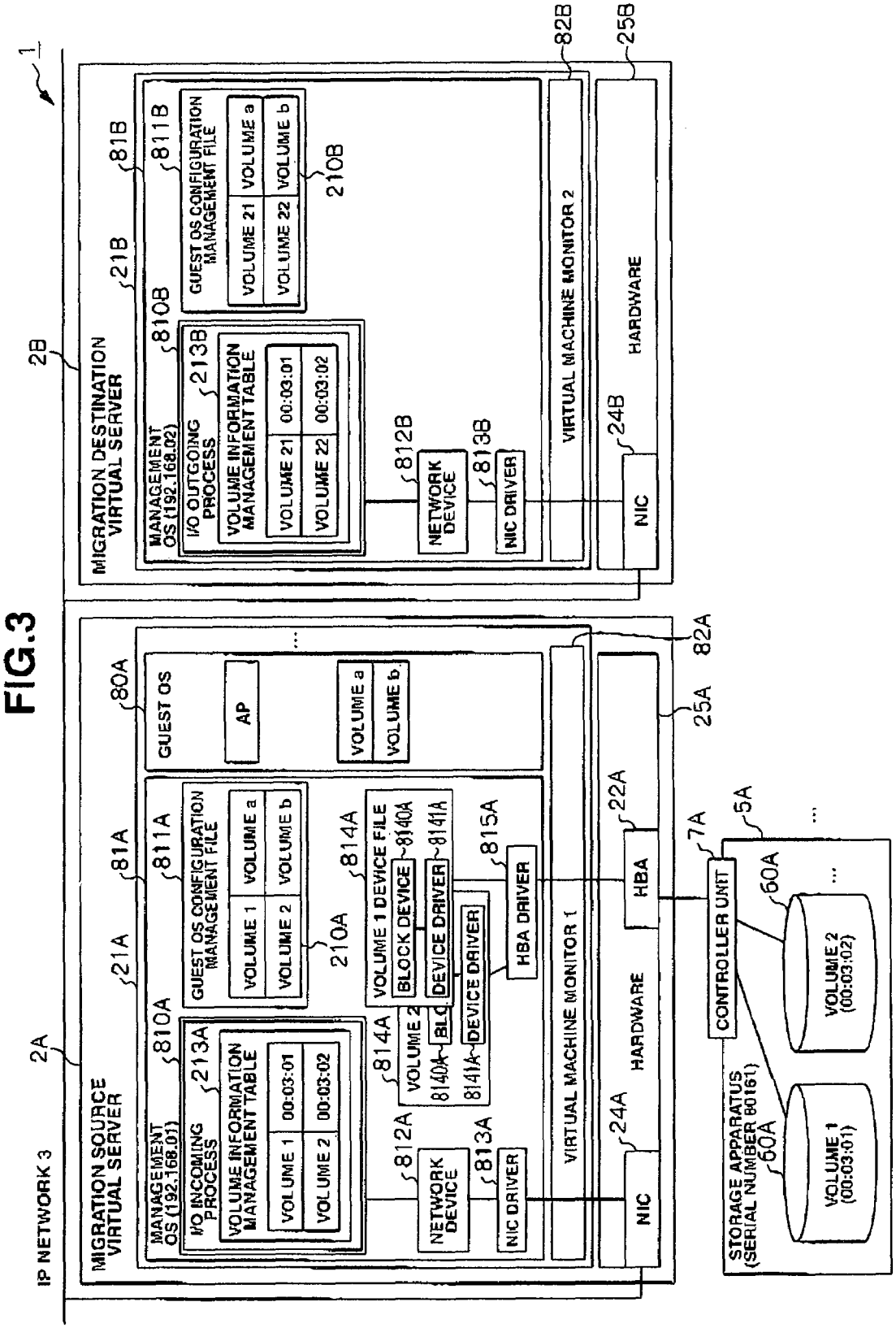
FIG. 3 is a block diagram showing the software configuration of a virtual computer system according to the first embodiment.

The specific software configuration is illustrated in FIG. 3. Foremost, the migration source virtual server 2A is a server for simultaneously operating a plurality of virtual OSes (hereinafter referred to as "guest OSes") that operate applications AP in a single server machine. The migration source virtual server 2A comprises, in addition to the guest OS 80A, a management OS 81A, a virtual machine monitor 82A, and the foregoing hardware 25A.

The guest OS 80A recognizes a plurality of volumes a, b for storing user data in the application AP.

The management OS 81A is an OS for managing the hardware resource of the migration source virtual server 2A and managing a plurality of guest OSes 80A, and recognizes volumes 1, 2. The management OS 81A is sometimes loaded in a virtual machine monitor 82A described later depending on the virtual server 2.

In addition, the management OS 81A primarily comprises an I/O incoming process 810A for sending and receiving data between the migration source virtual server 2A and the migration destination virtual server 2B, a guest OS management file 811A for managing the association between the volumes a, b recognized by the plurality of guest OSes 80A and the volumes 1, 2 recognized by the management OS 81A, and a volume device file 814A to be formed in association with the volumes a, b recognized by the guest OS 80A.

The I/O incoming process 810A is a process for associating the volume recognized by the I/O outgoing process 810B in the migration destination virtual server 2B and the volume recognized by the I/O incoming process 810A, and operating such volumes in the management OS that issues I/O request commands such as a read command and a write command.

The I/O incoming process 810A is connected to a network device 812A for sending and receiving data using the IP network 3, and the network device 812A is connected to an NIC (Network Interface Card) driver 813A that is called each time the application AP uses the IP network 3.

The volume device file 814A is a device file for recognizing the volumes 1, 2 formed in the storage apparatus 5A, and is formed in correspondence with the number of volumes 1, 2 formed in the storage apparatus 5A. A block device 8140A recognizes the volumes 1, 2 in the storage apparatus 5A, and is registered in a device driver 8141A in correspondence with the recognized volumes 1, 2.

The volume device file 814A is also connected to an HBA driver 815A that is called each time the SAN 4 is used. Incidentally, although the HBA driver 815A is also provided in a quantity corresponding to the number of volume device files 814A, the illustration thereof is omitted in the drawings.

The virtual machine monitor 82A performs switch processing of adjusting the application processing to be performed by each of the plurality of guest OSes 80A and deciding which guest OS 80A's application processing should be executed. Since this switching is conducted at high speed, it appears that the plurality of guest OSes 80A are operating simultaneously.

In the hardware 25A, the foregoing HBA 22A is connected to the HBA driver 815A, and the NIC 24 is connected to the NIC driver 813A.

The migration destination virtual server 2B shows the software configuration of a status where the live migration of the guest OS 80A operating in the migration source virtual server 2A is not executed. The migration destination virtual server 2B comprises a management OS 81B, a virtual machine monitor 82B, and the foregoing hardware 25B.

The management OS 81B primarily comprises an I/O outgoing process 810B for sending and receiving data between the migration source virtual server 2A and the migration destination virtual server 28, and a guest OS management file 811B for managing the association of a volume recognized by the guest OS 80 after live migration and a volume recognized by the management OS 81B.

The network device 812B, the NIC driver 813B, the virtual machine monitor 82B, and the NIC 24B are configured the same as the foregoing migration source virtual server 2A, and the detailed explanation thereof is omitted.

(1-2) Table Configuration

The various table configurations stored in the main memory 21 of the virtual server 2 are now explained.

(1-2-1) Volume Allocation Table

The volume allocation table 210 is a table stored in the guest OS configuration management file 811 of the main memory 21, and is used for deciding which volume 60 in the storage apparatus 5A is to be recognized by which guest OS 80.

The volume allocation table 210 is configured from a "guest OS identifying information" column 2100 showing the identifying information for identifying the plurality of guest OSes, a "management OS volume name" column 2101 showing the volume name that is managing the volume 60 of the storage apparatus 5A in the management OS 81, and a "guest OS volume name" column 2102 showing the volume name that is managing the volume 60 of the storage apparatus 5A in the guest OS 80. As shown in FIG. 4, the volume name that is managing the volume 60 of the storage apparatus 5A in the management OS 81 and the volume name that is managing the volume 60 of the storage apparatus 5A in the guest OS 80 are associated.

(1-2-2) Memory Area Management Table

The memory area management table 211 is a table for managing which guest OS 80 is using which area in the main memory 21. Upon executing live migration, data of the guest OS 80 to be subject to live migration in the area of the main memory 21 is copied and sent to the migration destination virtual server 2B based on the management table 211.

The memory area management table 211, as shown in FIG. 5, is configured from a "guest OS identifying information" column 2110, a "memory area start address" column 2111 showing the start address for storing data in the guest OS 80, and a "memory area end address" column 2112 showing the end address storing data in the guest OS 80.

The contents of the "guest OS identifying information" column 2110 are the same as the contents of the foregoing "guest OS identifying information" column 2100, and the detailed explanation thereof is omitted.

(1-2-3) Memory Differential Management Table

The memory differential management table 212 is a table for managing, as differential data, data of the guest OS 80 that is updated even while the data of the guest OS 80 to be subject to live migration in the main memory 21 area is being sent to the migration destination virtual server 2B.

The memory-differential management table 212, as shown in FIG. 6, is configured from a "guest OS identifying information" column 2120, a "memory differential sequential number" column 2121 showing the management number given for processing the differential data, and a "changed address" column 2122 showing the address where the differential data is stored in the main memory 21 area.

The contents of the "guest OS identifying information" column 2120 are the same as the contents of the foregoing "guest OS identifying information" column 2100, and the detailed explanation thereof is omitted.

(1-2-4) Volume Information Management Table

The volume information management table 213, as shown in FIG. 7, is a table stored in the I/O incoming process 810A or the I/O outgoing process 810B, and is used for associating the volume identifying information of the storage apparatus 5A and the volume name recognized by the respective management OSes 81. Accordingly, the volume information management table 213 is retained by each management OS.

The volume information management table 213 is configured from a "volume management number" column 2130 showing the management number of the volume 60, a "management OS volume name" column 2131, a "storage apparatus serial number" column 2132 showing the serial number of the storage apparatus 5A, a "volume identifying information" column 2133 showing the identifying information of the volume, and a "remote-side management OS identifying information" column 2134 showing the IP address of the live migration source or destination.

For example, in the case of the migration source virtual server 2A, the IP address of the migration destination virtual server 2B of the live migration destination is registered in the "remote-side management OS identifying information" column 2134. Meanwhile, in the case of the migration destination virtual server 2B, the IP address of the migration source virtual server 2A of the live migration source is registered in the "remote-side management OS identifying information" column 2134.

The contents of the "management OS volume name" column 2131 are the same as the contents of the foregoing "management OS volume name" column 2101, and the detailed explanation thereof is omitted.

(1-3) Live Migration Processing

The method of migrating the guest OS 80 in the migration source virtual server 2A to the migration destination virtual server 2B based on the foregoing software configuration and table configuration is now explained.

(1-3-1) Volume Recognition Processing

Foremost, as the advance preparation for executing live migration, it is necessary to set a common volume 60 that can be recognized (identified) by the migration source virtual server 2A and the migration destination virtual server 2B.

Specifically, as shown in FIG. 8 and FIG. 9, the user uses the information I/O devices 26A, 27A to issue an I/O incoming setting command to the management OS 81A. The I/O incoming setting command is configured from a command name as the I/O incoming setting command, and a user ID and a password as information required for executing the command. The user sets the user ID and the password to be used for authentication when connection is requested from the management OS 81B of the migration destination virtual server 2B in the management OS 81A of the migration source virtual server 2A (S1). The set information is retained in the I/O incoming process 810A.

Subsequently, the user issues an I/O incoming volume setting command to the management OS 81A, and sets which volume 60A among the volumes 60A recognized by the management OS 81A is to also be recognized by the management OS 81B of the migration destination virtual server 2B (S2). The I/O incoming volume setting command is configured from a command name as the I/O incoming volume setting command, a volume name as information required for executing the command, and identifying information of the management OS that permits recognition. The set information is retained in the volume information management table 213A of the I/O incoming process 810A. The process up to this point completes the advance preparation concerning the migration source virtual server 2A.

The user thereafter issues a volume recognition command at an arbitrary timing to the management OS 81B of the migration destination virtual server 2B (S3). The volume recognition command is a command for recognizing a volume permitted based on the I/O incoming volume setting command with a separate management OS, and is configured from a command name as the volume recognition command, an IP address showing the management OS 81B, a serial number of the storage apparatus 5A to recognize the volume, volume identifying information, and a user ID and a password.

When the I/O outgoing process 810B receives the volume recognition command, it sends the command as a recognition request to the I/O incoming process 810A (S4).

When the I/O incoming process 810A receives the recognition request, it confirms the user ID and the password, and completes the login (S5).

The management OS 81A selects one volume 60A to be recognized by the migration destination virtual server 2B from the volume information management table 213A, and confirms whether the migration destination virtual server 2B is able to access the selected volume 60A (S6). If the selected volume 60A is accessible, the management OS 81A registers the IP address showing the management OS 81B of the migration destination virtual server 2B in the volume information management table 213A (S7). The management OS 81A sets the guest OS 80 that is associated with the volume 60 selected from the volume information management table 213A as the target of live migration.

The I/O incoming process 810A thereafter sends the volume identifying information of the volume 60 selected from the volume information management table 213A to the I/O outgoing process 810B (S8).

When the I/O outgoing process 810B receives the volume identifying information (S9), it creates a block device 8140B of the target volume, registers the remote device driver 8141B in the created block device 8140B, and creates a volume device file 814B (S10). The block device 8140B is created according to the number of target volumes, and the remote device driver 8141B is also registered in the block device 8140B according to the number of volumes.

The I/O outgoing process 810B registers the received volume identifying information in the volume information management table 213B of the I/O outgoing process 810B, and also registers the volume name recognized by the management OS 81B based on the received volume identifying information (S11).

The management OS 81B thereafter creates a volume name recognized by the guest OS to be subject to live migration and a volume name recognized by the management OS 81B in the volume allocation table 210B of the guest OS configuration management file 811B (S12).

The migration source virtual server 2A and the migration destination virtual server 2B are thereby able to recognize a common volume. This situation is shown in FIG. 10.

Figure 10:
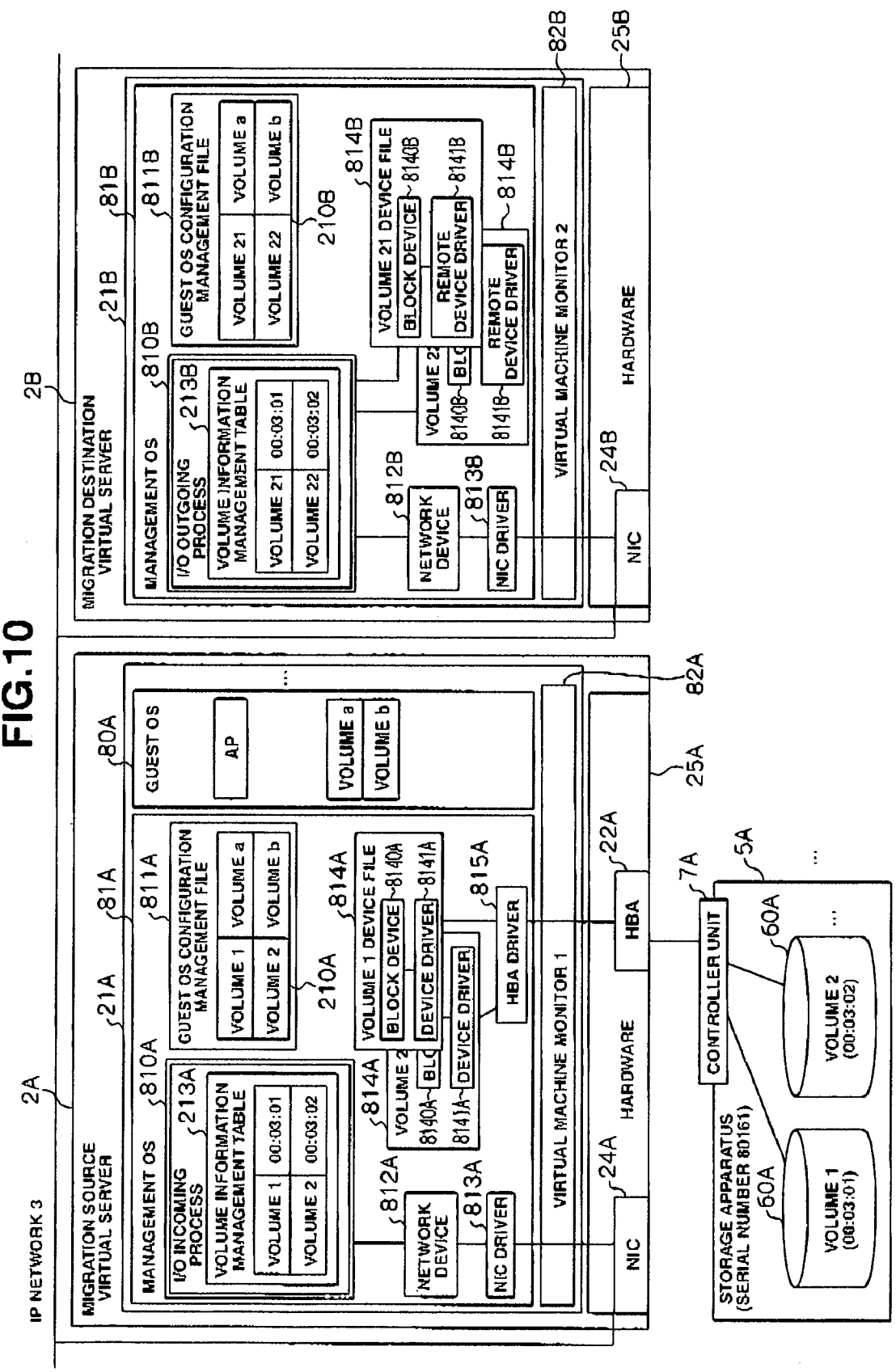
FIG. 10 is a block diagram explaining volume recognition processing according to the first embodiment.

As shown in FIG. 10, 00:03:01 and 00:03:02 are depicted as two pieces of volume identifying information commonly recognized by the migration source virtual server 2A and the migration destination virtual server 2B. As a result of the migration source virtual server 2A and the migration destination virtual server 2B executing the foregoing volume recognition processing, a volume 1 and a volume 2 in the management OS 81A are set in correspondence with the volume identifying information 00:03:01 and 00:03:02. The volume 1 and the volume 2 are volume names recognized by the management OS 81A.

Meanwhile, a volume 21 and a volume 22 in the management OS 81B are set in correspondence to the volume identifying information 00:03:01 and 00:03:02. The volume 21 and the volume 22 are volume names recognized by the management OS 81B.

Since the volume identifying information 00:03:01 and 00:03:02 are recognized as the volume a and the volume b by the guest OS 80A, the migration source virtual server 2A associates the volume 1 and the volume a, and the volume 2 and the volume b. In addition, the migration destination virtual server 2B associates the volume 21 and the volume a, and the volume 22 and the volume b.

The reason why volume identifying information is used between the I/O incoming/outgoing processes 810AB is because there are cases where the volume name in the management OS 81A is changed due to the restart of the management OS 81A or the like.

(1-3-2) Live Migration Processing

Live migration processing of migrating the guest OS in the migration source virtual server 2A to the migration destination virtual server 2B after setting a common volume 60 that can be recognized by the migration source virtual server 2A and the migration destination virtual server 2B is now explained.

When the migration source virtual server 2A and the migration destination virtual server 2B execute the volume recognition processing explained above (S1 to S12), live migration processing is started.

Figure 11:
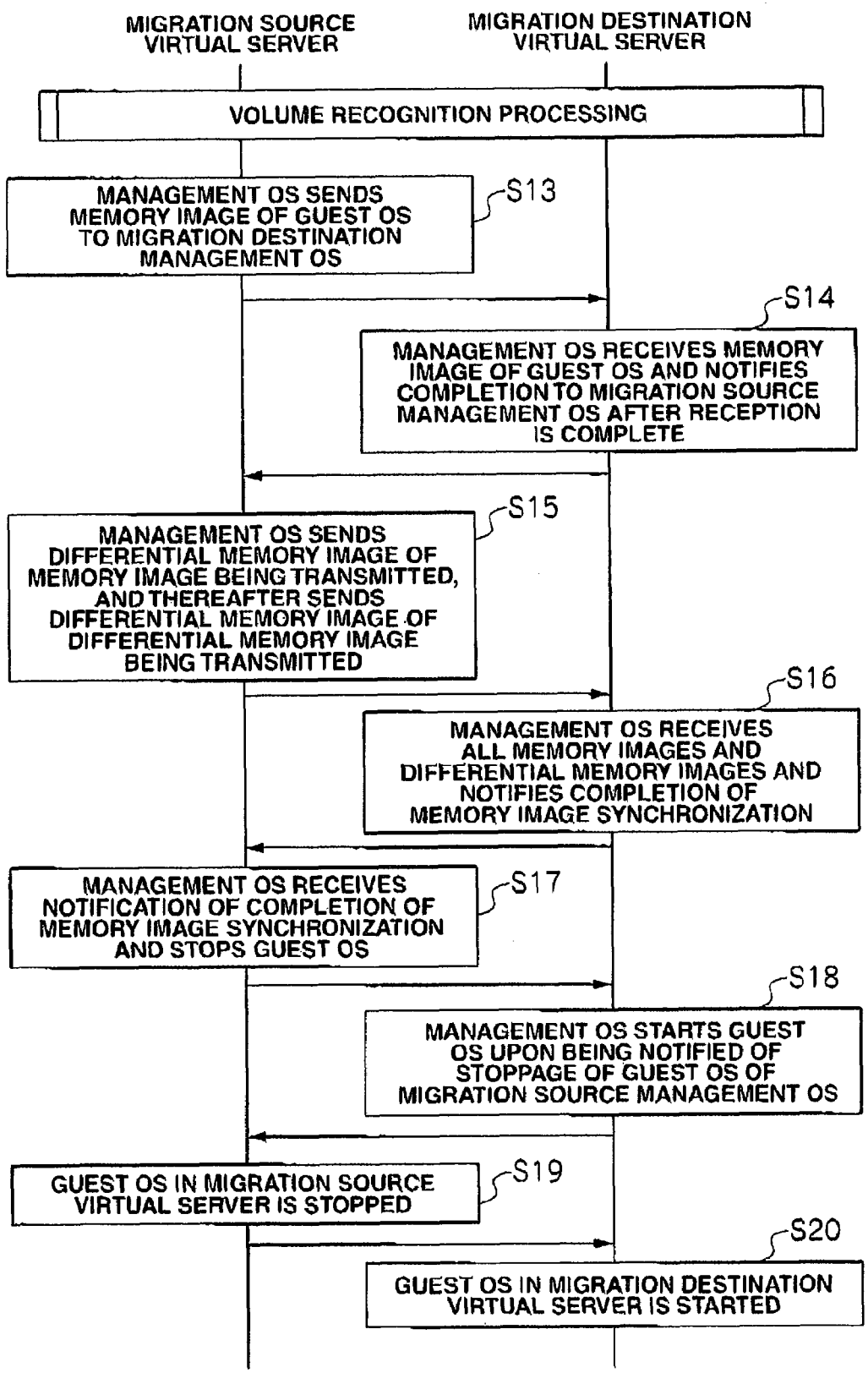
FIG. 11 is a flowchart showing live migration processing according to the first embodiment.

Specifically, as shown in FIG. 11, the management OS 81A of the migration source virtual server 2A refers to the memory area management table 211A, and sends the memory image of the guest OS 80A to be subject to live migration to the management OS 81B of the migration destination virtual server 2B (S13). Here, a memory image refers to data to be stored in the area of the main memory 21 used by the guest OS to be subject to live migration.

The management OS 81B of the migration destination virtual server 2B that received the memory image of the guest OS 80A notifies the completion of reception to the management OS 81A of the migration source virtual server 2A (S14).

Subsequently, the management OS 81A of the migration source virtual server 2A refers to the memory differential management table 212A, and sends the differential data updated in the area of the main memory 21 during the sending of the memory image as differential memory image to the management OS 81B of the migration destination virtual server 2B. After the sending of the differential memory image is complete, the management OS 81A of the migration source virtual server 2A additionally sends the differential memory image that was updated in the area of the main memory 21 while the differential memory image was being sent. When the differential of the memory image to be updated during the sending of the memory image becomes sufficiently small, the management OS 81A of the migration source virtual server 2A once stops the processing of the guest OS 80A, and sends all differential memory images to the management OS 81B of the migration destination virtual server 2B (S15).

When the management OS 81B of the migration destination virtual server 2B receives a memory images and differential memory images, it notifies the management OS 81A of the migration source virtual server 2A that the synchronization of the memory image of the guest OS 80A and the memory image of the guest OS 80B after live migration is complete (S16).

When the management OS 81A of the migration source virtual server 2A receives the synchronization completion notice, it stops the guest OS 80A, and notifies the management OS 81B of the migration destination virtual server 2B of the stoppage (S17).

When the management OS 81B of the migration destination virtual server 2B receives the stoppage notice of the guest OS 80A, the migration destination virtual server 2B starts the guest OS 80B (S18).

Figure 12:
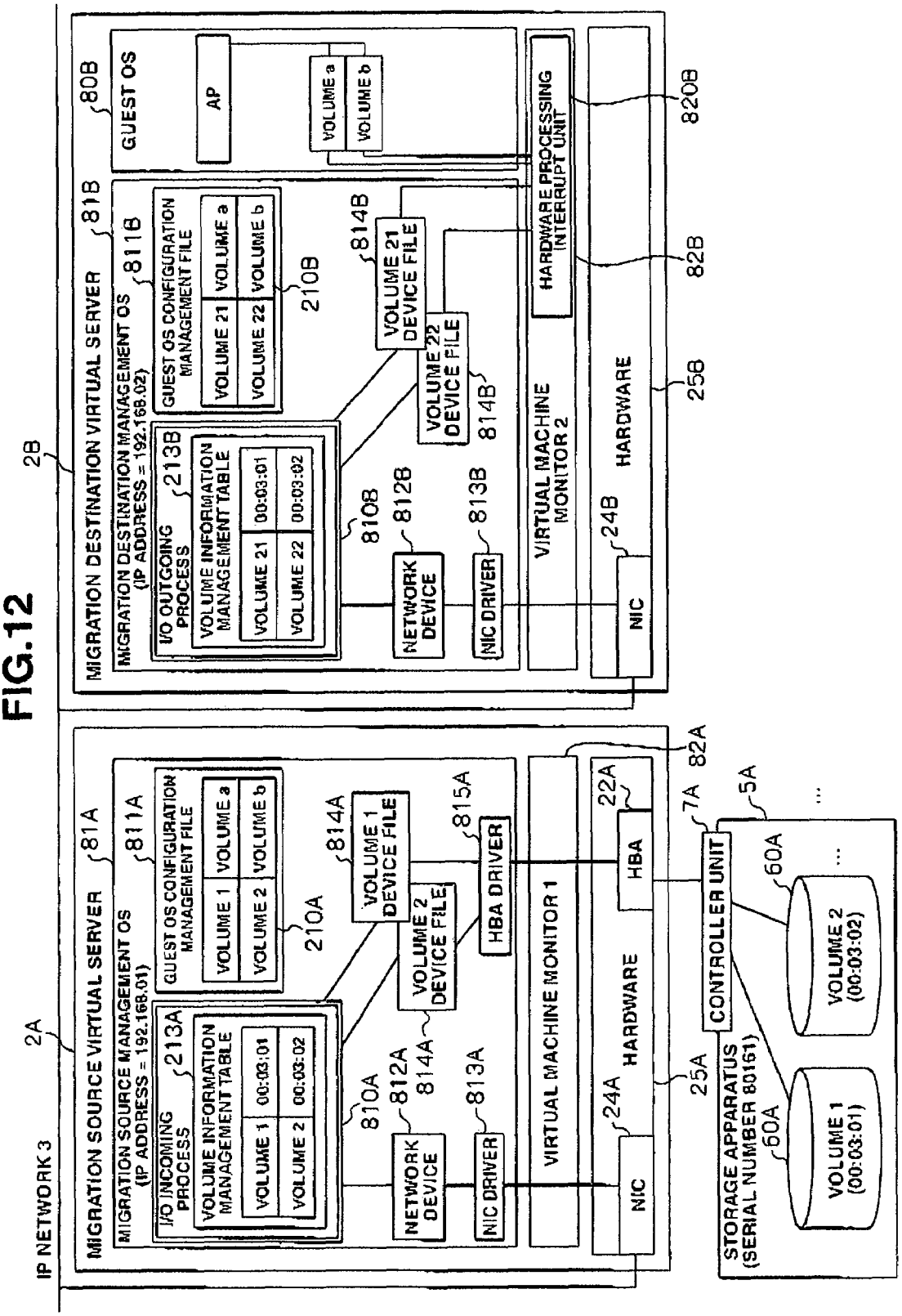
FIG. 12 is a block diagram explaining live migration processing according to the first embodiment.

The guest OS 80A is thereafter stopped in the management OS 81A of the migration source virtual server 2A (S19), and the guest OS 80B is started in the management OS 81B of the migration destination virtual server 2B (S20). The virtual computer system 1 after the execution of live migration processing is shown in FIG. 12.

The user is able to confirm that the live migration was executed normally from the monitor 26A, 26B of the migration source virtual server 2A or the migration destination virtual server 2B.

FIG. 13 shows a screen S1 enabling the user to confirm that live migration was normally executed from the monitor 26A of the migration source virtual server 2A.

The screen display D1 shows a "volume name" column 100D, a "storage apparatus serial number" column 101D, a "volume identifying information" column 102D, a "remote/local volume identifying information" column 103D, and a "remote-side management OS identifying information" column 104D. The volume name shows the volume name of the storage apparatus 5A recognized by the management OS 81A. The remote/local volume identifying information shows the identifying information regarding whether the management OS 81A is externally allocating the corresponding volume 60, or whether the management OS 81A is externally importing the corresponding volume 60. For example, if the management OS 81A is allocating the corresponding volume to an external management OS, "export" is displayed, and if the management OS 81A is importing the corresponding volume from an external management OS, "import" is displayed. The remote-side management OS identifying information shows the IP address of the remote destination management OS 81.

The screen display D1 shows that the volume 1 recognized by the management OS 81A is allocated to an external management OS 81 having an IP address of "192.168.0.2."

FIG. 14 shows a screen S2 enabling the user to confirm that live migration was normally executed from the monitor 26B of the migration destination virtual server 2B.

The screen display D2 shows that the volume 21 recognized by the management OS 81B is being imported from the management OS 81 having an IP address of "192.168.0.1." The contents of the screen display columns 200D to 204D are the same as the contents described above, and the detailed explanation thereof is omitted.

As described above, by the migration source virtual server 2A and the migration destination virtual server 2B performing volume recognition processing in advance, live migration of the guest OS can be performed smoothly.

(1-3-3) Inter-Process Communication Processing

Inter-process communication processing in which the migration destination virtual server 2B, after the volume recognition processing is complete, periodically confirms whether the volume 60 is being correctly recognized by the migration source virtual server 2A is now explained.

Figure 15:
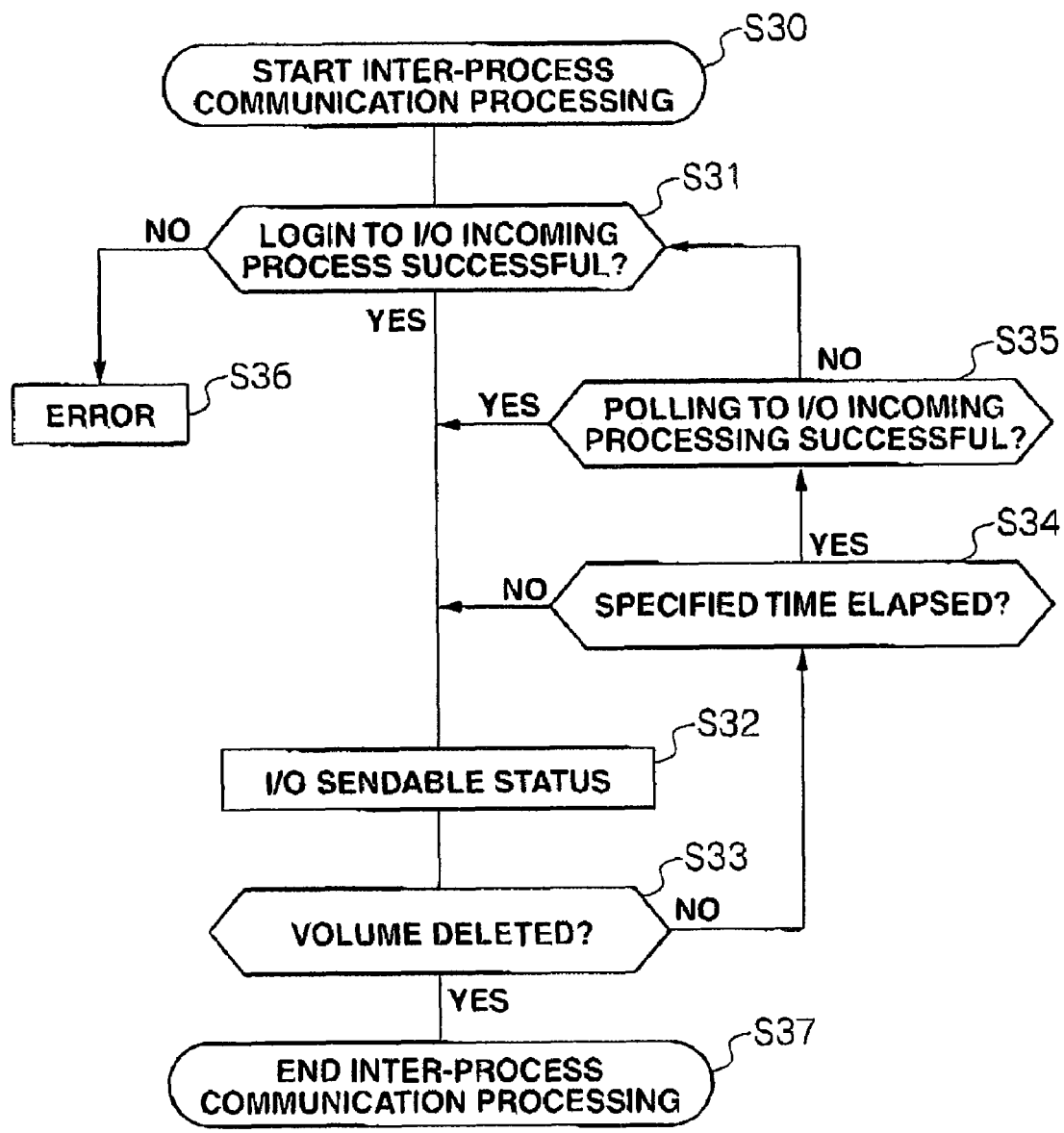
FIG. 15 is a flowchart showing inter-process communication processing according to the first embodiment.

Foremost, as shown in FIG. 15, the I/O outgoing process 810B of the migration destination virtual server 2B starts the inter-process communication processing at an arbitrary timing (S30). The I/O outgoing process 810B logs into the I/O incoming process 810A (S31), and, when the login is successful (S31: YES), since the status will enable the I/O issued from the migration destination virtual server 2B to be sent to the I/O incoming process 810A (S32), it executes the I/O processing described later if the guest OS after the execution of live migration issues an I/O request.

Subsequently, the I/O outgoing process 810B confirms whether the volume recognized by the migration source virtual server 2A has been deleted (S33), and, when such volume has been deleted (S33; YES), it then ends the inter-process communication processing (S37).

Meanwhile, when the I/O outgoing process 810B confirms that the volume recognized by the migration source virtual server 2A has not been deleted (S33: NO), it determines whether a specified time from a case where the I/O to the migration source virtual server 2A is successful, or from a case where polling is periodically performed (S34). If the I/O is successful, this shows that the I/O has been properly performed to the volume recognized by the migration source virtual server 2A.

When the I/O outgoing process 810B determines that a specified time has elapsed (S34: YES), it performs polling to the I/O incoming process 810A, and, if the polling is successful (S35: YES), and executes the step at step S32. Even if the I/O outgoing process 810B determines that a specified time has not elapsed (S34: NO), it executes the step at step S32.

If the I/O outgoing process 810B determines that the polling to the I/O incoming process 810A ends in a failure (S35: NO), it displays an error and then ends the processing (S36).

(1-3-4) Read Processing

Read processing when the guest OS 80B after the execution of live migration as described above issues a read request to the volume 60 of the storage apparatus 5A is now explained.

Figure 16:
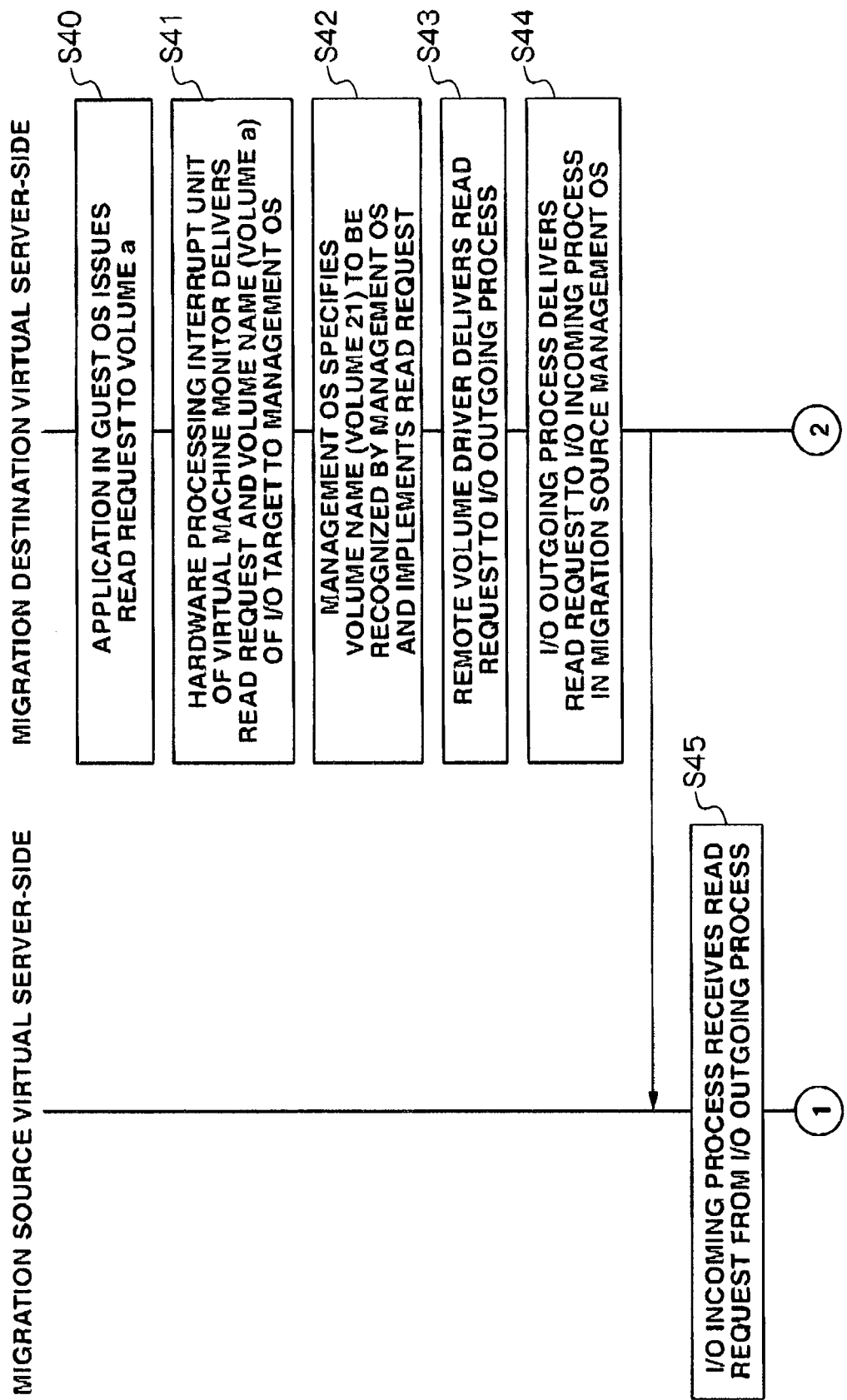
FIG. 16 is a flowchart showing read processing according to the first embodiment.
Figure 17:
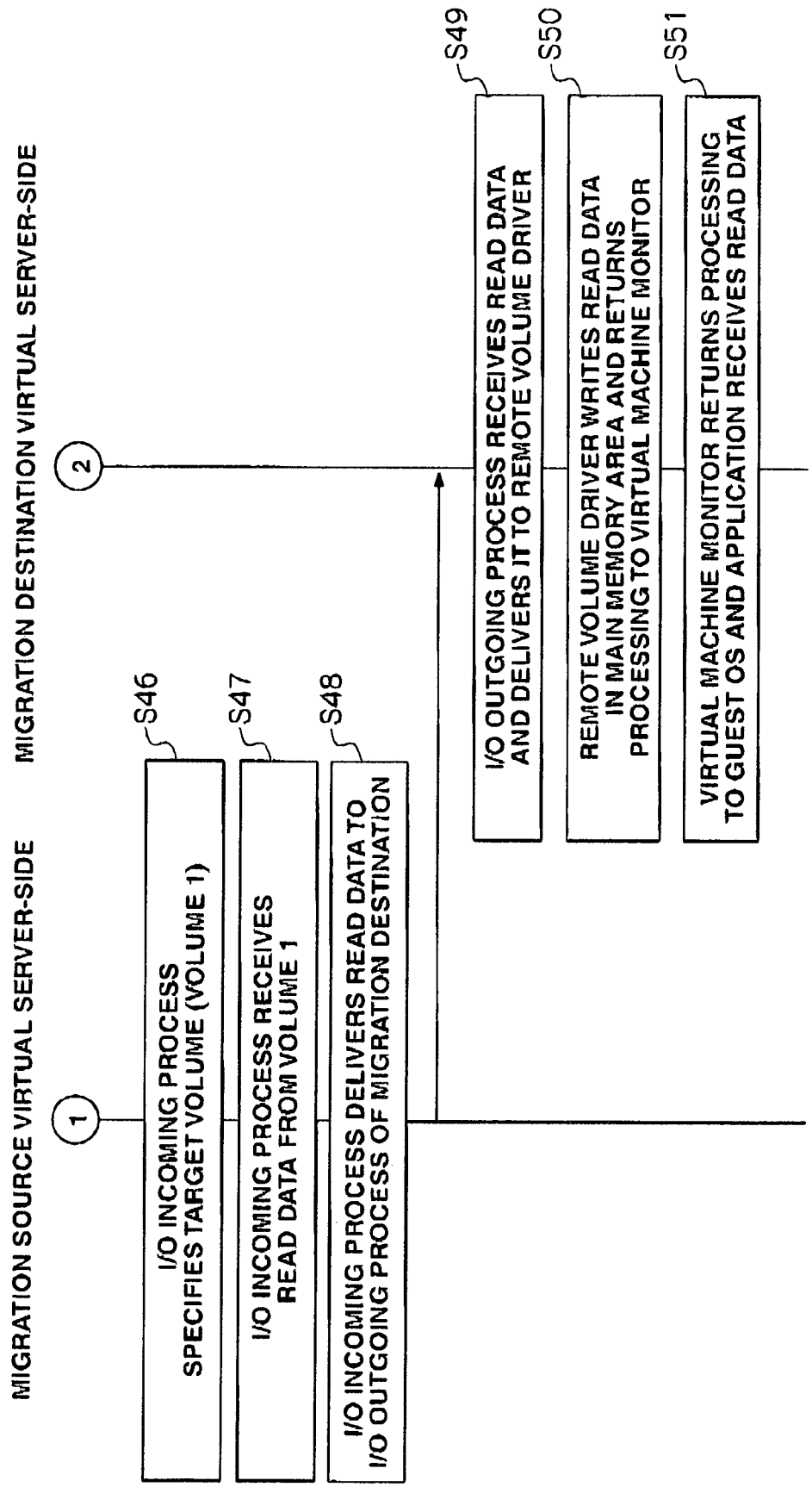
FIG. 17 is a flowchart showing read processing according to the first embodiment.

Foremost, as shown in FIG. 16 and FIG. 17, the processing is started when the application AP in the guest OS 80B issues a read request to the volume recognized by the guest OS 80B (S40).

When a read request is issued from the application AP, the virtual machine monitor 82B detects an access to the hardware 25B, and the hardware processing interrupt unit 820B in the virtual machine monitor 82B sends the read request and the volume name of the I/O target (read target) to the management OS 81B (S41). For example, let it be assumed that the volume a is designated as the volume name of the I/O target.

Here, the hardware processing interrupt unit 820B is equipped in the virtual machine monitor 82B of the migration destination virtual server 2B, and comprises an interrupt function for delivering an I/O request to the volume device file 814B without delivering an I/O request to the hardware 25B upon detecting access to the hardware 25B based on the I/O request from the application AP.

Subsequently, the management OS 81B refers to the volume allocation table 210B, specifies a volume name in the management OS 81B corresponding to the volume name of the I/O target (read target), and issues a read request to the specified volume. For example, let it be assumed that the volume 21 as the volume name in the management OS 81B (S42).

The remote volume driver 8141B registered in the volume device file 814B of the volume 21 sends a read request to the I/O outgoing process 810B (S43).

The I/O outgoing process 810B sends the read request to the I/O incoming process 810A of the migration source virtual server 2A via the IP network (S44).

The I/O incoming process 810A receives the read request from the I/O outgoing process 810B of the migration destination virtual server 2B (S45). Here, as shown in FIG. 18, the contents of the read request to be sent and received between the processes include a sequential number R0 showing the order of read processing, a storage apparatus serial number R1 to which the read target volume 60 belongs, read target volume identifying information R2, a SCSI command (read command) R3, a read data address R4 showing the address of the read target volume 60, and a data length R5 showing the length of the actual read data.

The I/O incoming process 810A refers to the volume information table 213A, and specifies the volume name in the management OS 81A corresponding to the read target volume identifying information (S46). For example, let it be assumed that the volume 1 is specified as the volume name in the management OS 81A.

The I/O incoming process 810A issues a read request to the volume 1, receives read data from the volume 1 (S47), and sends the read data to the I/O outgoing process 810B via the IP network 3 (S48).

Here, as shown in FIG. 19, the contents of the read data sent between the processes include a sequential number R0, a storage apparatus serial number R1 to which the read target volume 60 belongs, read target volume identifying information R2, a SCSI command (read command) R3, a read data address R4, a data length R5 of the read data, and a read data R6.

When the I/O outgoing process 810B receives the read data, it delivers the read data to the remote volume driver 8141B registered in the volume device file 814B of the volume 21 (S49).

The remote volume driver 8141B registered in the volume device file 814B of the volume 21 records the read data in the area of the main memory 21B (S50). The hardware processing interrupt unit 820B of the virtual machine monitor 82B returns the processing to the guest OS 80B, and ends the read processing when the application AP receives the read data (S51).

As described above, the virtual computer system 1 is able to normally execute read processing even after the execution of live migration.

(1-3-5) Write Processing

Write processing when the guest OS 80B after the execution of live migration issues a write request to the volume 60 of the storage apparatus 5A is now explained.

Figure 20:
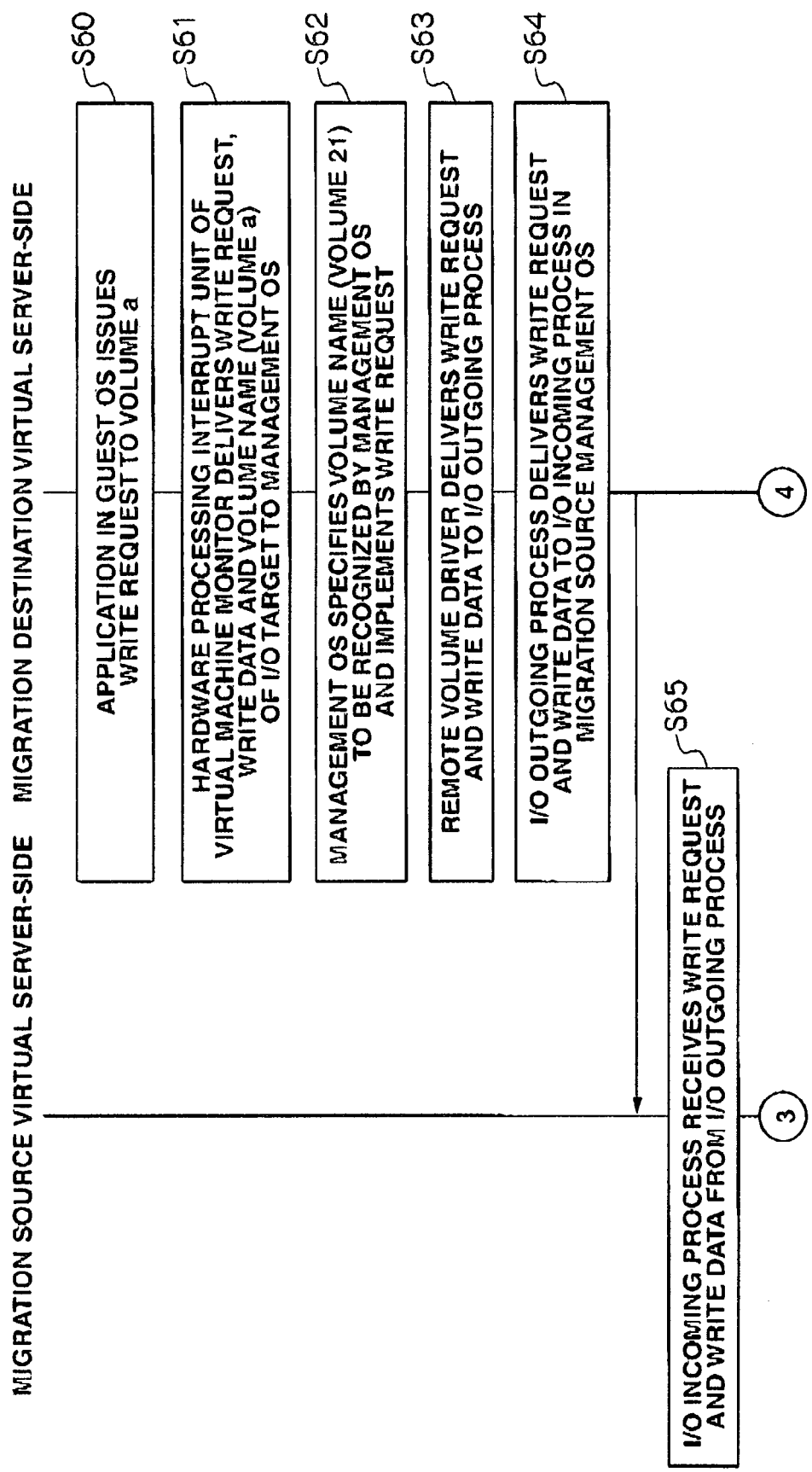
FIG. 20 is a flowchart showing write processing according to the first embodiment.
Figure 21:
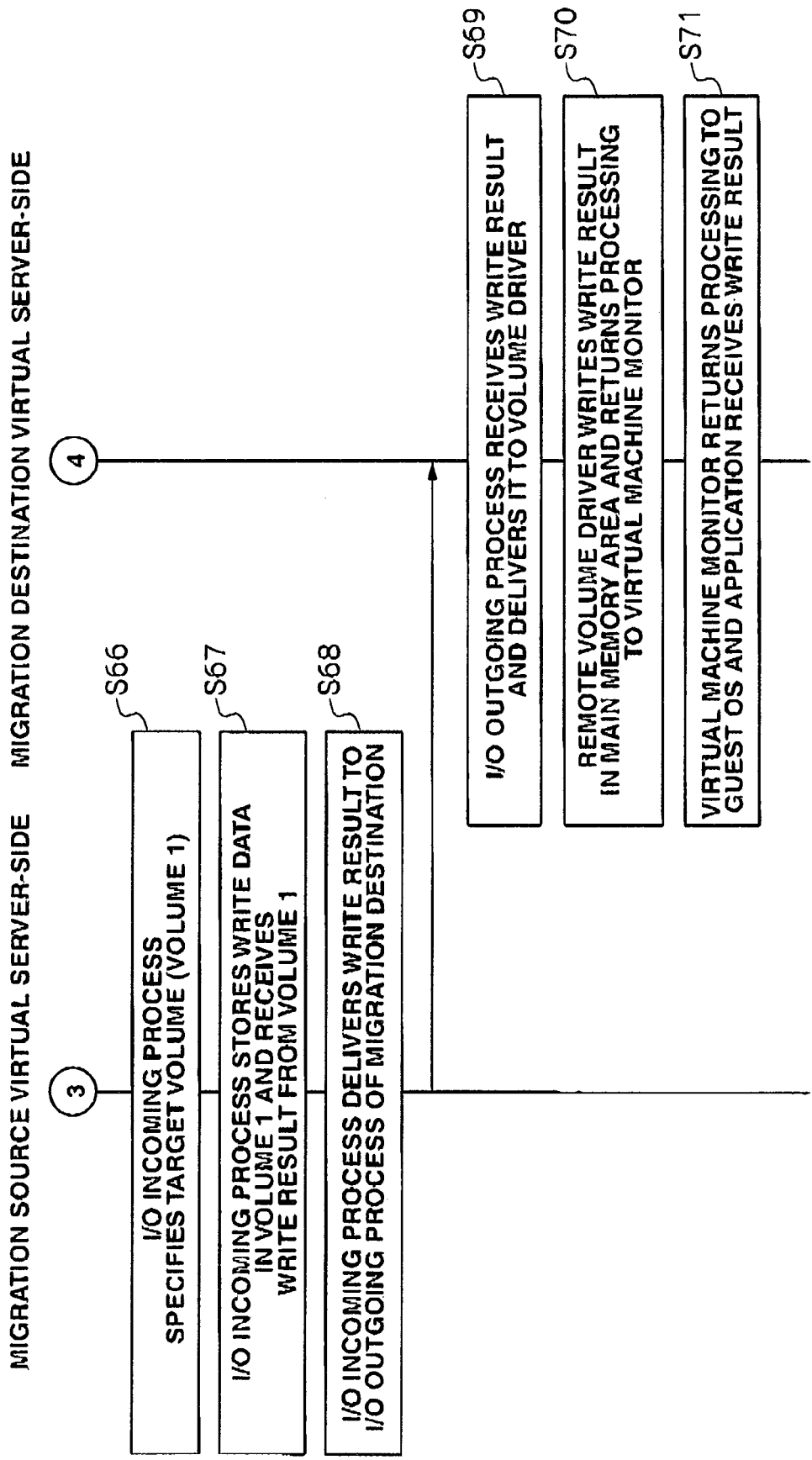
FIG. 21 is a flowchart showing write processing according to the first embodiment.

Foremost, as shown in FIG. 20 and FIG. 21, the processing is started when the application AP in the guest OS 80B issues a write request to the volume recognized by the guest OS 80B (S60).

When a write request is issued from the application AP, the virtual machine monitor 82B detects an access to the hardware 25B, and the hardware processing interrupt unit 820B in the virtual machine monitor 82B sends the write request, write data and the volume name of the I/O target (write target) to the management OS 81B (S61). For example, let it be assumed that the volume a is designated as the volume name of the I/O target.

Subsequently, the management OS 81B refers to the volume allocation table 2108, specifies a volume name in the management OS 81B corresponding to the volume name of the I/O target (write target), and issues a write request to the specified volume. For example, let it be assumed that the volume 21 as the volume name in the management OS 81B (S62).

The remote volume driver 8141B registered in the volume device file 814B of the volume 21 sends a write request and write data to the I/O outgoing process 810B (S63).

The I/O outgoing process 810B sends the write request and write data to the I/O incoming process 810A of the migration source virtual server 2A via the IP network (S64).

The I/O incoming process 810A receives the write request and write data from the I/O outgoing process 810B of the migration destination virtual server 2B (S65). Here, as shown in FIG. 22, the contents of the write request to be sent and received between the processes include a sequential number W0 showing the order of write processing, a storage apparatus serial number W1 to which the write target volume 60 belongs, write target volume identifying information W2, a SCSI command (write command) W3, a write data address W4 showing the address of the write target volume 60, a data length W5 showing the length of the actual write data, and a write data W6.

Figure 23:
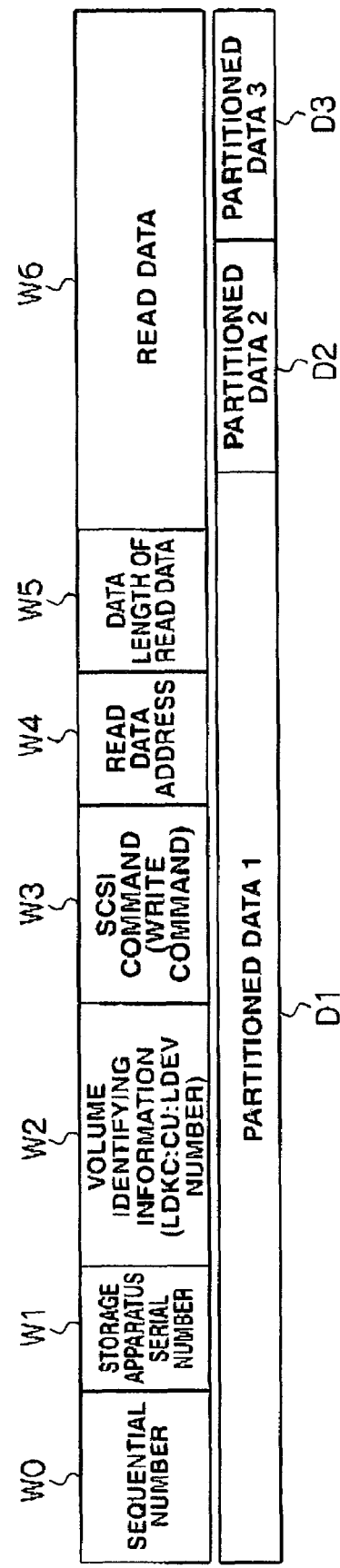
FIG. 23 is an explanatory diagram explaining a command issued during a write request according to the first embodiment.
Figure 24:
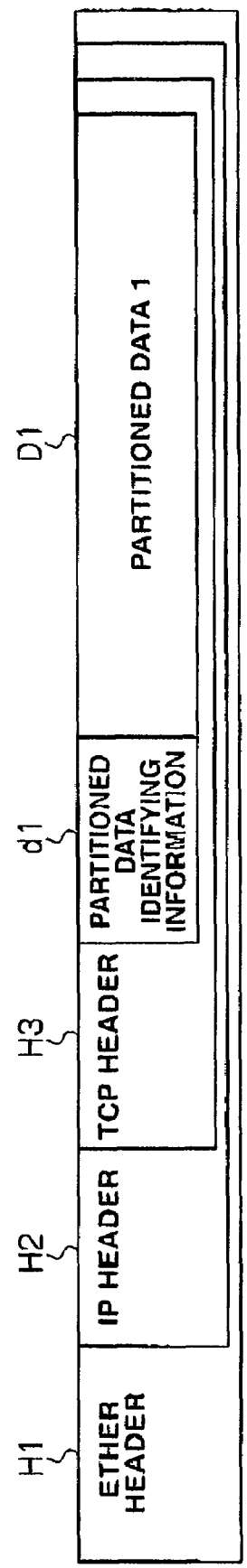
FIG. 24 is an explanatory diagram showing the contents of partitioned data according to the first embodiment.

As shown in FIG. 23, when actually sending the contents of the write request from the I/O outgoing process 810B to the I/O incoming process 810A, such contents are partitioned into several packets, and the partitioned packets are sent as partitioned data D1 to D3. In addition, as shown in FIG. 24, the contents to be sent include partitioned data identifying information d1 to d3 of the respective partitioned data D1 to D3, and headers H1 to H3 of the respective communication protocol layers in the IP network 3. Partitioned data identifying information is identifying information of partitioned data including the sequential number and partitioned data number required for restoration as one of the contents of the write request.

The I/O incoming process 810A refers to the volume information table 213A, and specifies a volume name in the management OS 81A corresponding to the write target volume identifying information (S66). For example, let it be assumed that the volume 1 is specified as the volume name in the management OS 81A.

The I/O incoming process 810A issues a write request to the volume 1 (S67). When the I/O incoming process 810A receives from the volume 1 a write result indicating success when the write data was stored in the volume 1 or a write result indicating failure when the write data could not be stored, and sends the write result to the I/O outgoing process 810B via the IP network 3 (S68).

Here, as shown in FIG. 25, the contents of the write data sent between the processes include a sequential number W0, a storage apparatus serial number W1 to which the write target volume 60 belongs, write target volume identifying information W2, a SCSI command (write command) W3, a write data address W4, and a write data W7.

When the I/O outgoing process 810B receives the write result, it delivers the write result to the remote volume driver 8141B registered in the volume device file 814B of the volume 21 (S69).

The remote volume driver 8141B registered in the volume device file 814B of the volume 21 records the write data in the area of the main memory 21B (S70). The hardware processing interrupt unit 820B of the virtual machine monitor 82B returns the processing to the guest OS 80B, and ends the write processing when the application AP receives the write result (S71).

As described above, the virtual computer system 1 is able to normally execute write processing even after the execution of live migration.

The I/O incoming process 810A and the I/O outgoing process 810B may also provide a thread in the respective processes for performing inter-process communication. Specifically, sleds according to the number of volume device files are provided in the respective processes. For example, a volume 1 sled and a volume 2 sled are provided in the I/O incoming process 810A. The volume 1 sled is connected to the volume 1 device file and the network device, and the volume 2 sled is similarly connected to the volume 2 device file and the network device. Similarly, a volume 21 sled and a volume 22 sled are provided in the I/O outgoing process 810B. The volume 21 sled is connected to the remote volume 21 device file and the network device, and the volume 22 sled is connected to the remote volume 21 device file and the network device.

(1-4) Effect of First Embodiment

As described above, the live migration of a virtual server can be executed even when a plurality of virtual servers are not able to share volumes of storage apparatuses.

In addition, after the execution of live migration, I/O processing can be executed to a common volume from the migration destination virtual server subject to live migration.

(2) Second Embodiment

A virtual computer system 100 according to the second embodiment is now explained.

(2-1) Software Configuration

Figure 26:
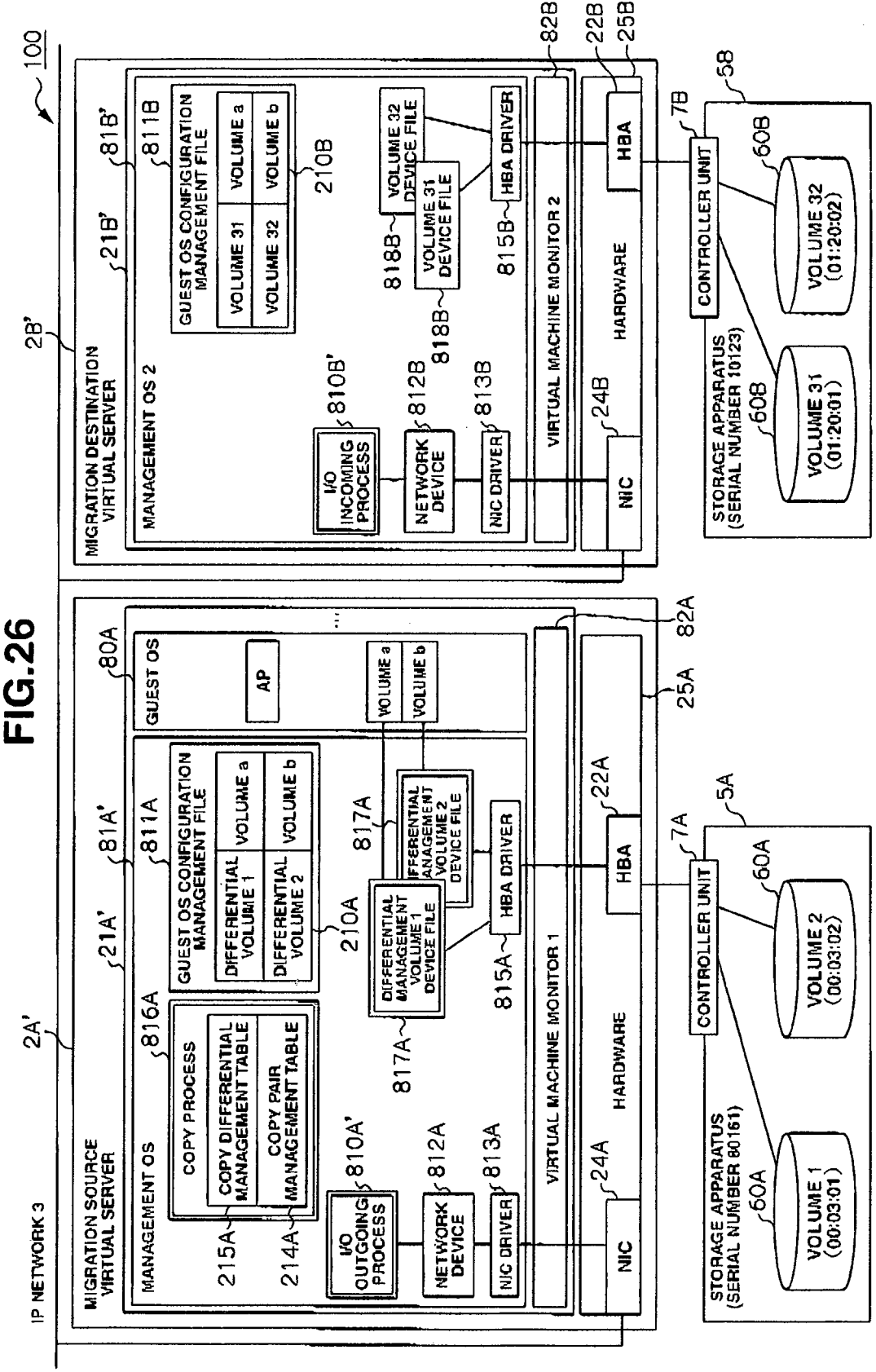
FIG. 26 is a block diagram showing the software configuration of a virtual computer system according to the second embodiment.

The software configuration of the virtual computer system 100 according to the present embodiment comprises, as shown in FIG. 26, in addition to the various software configurations explained in the virtual computer system 1 of the first embodiment, a copy process 816, a remote device file 818 and a differential management volume device file 817 in the respective management OSes 81A', B'.

Figure 27:
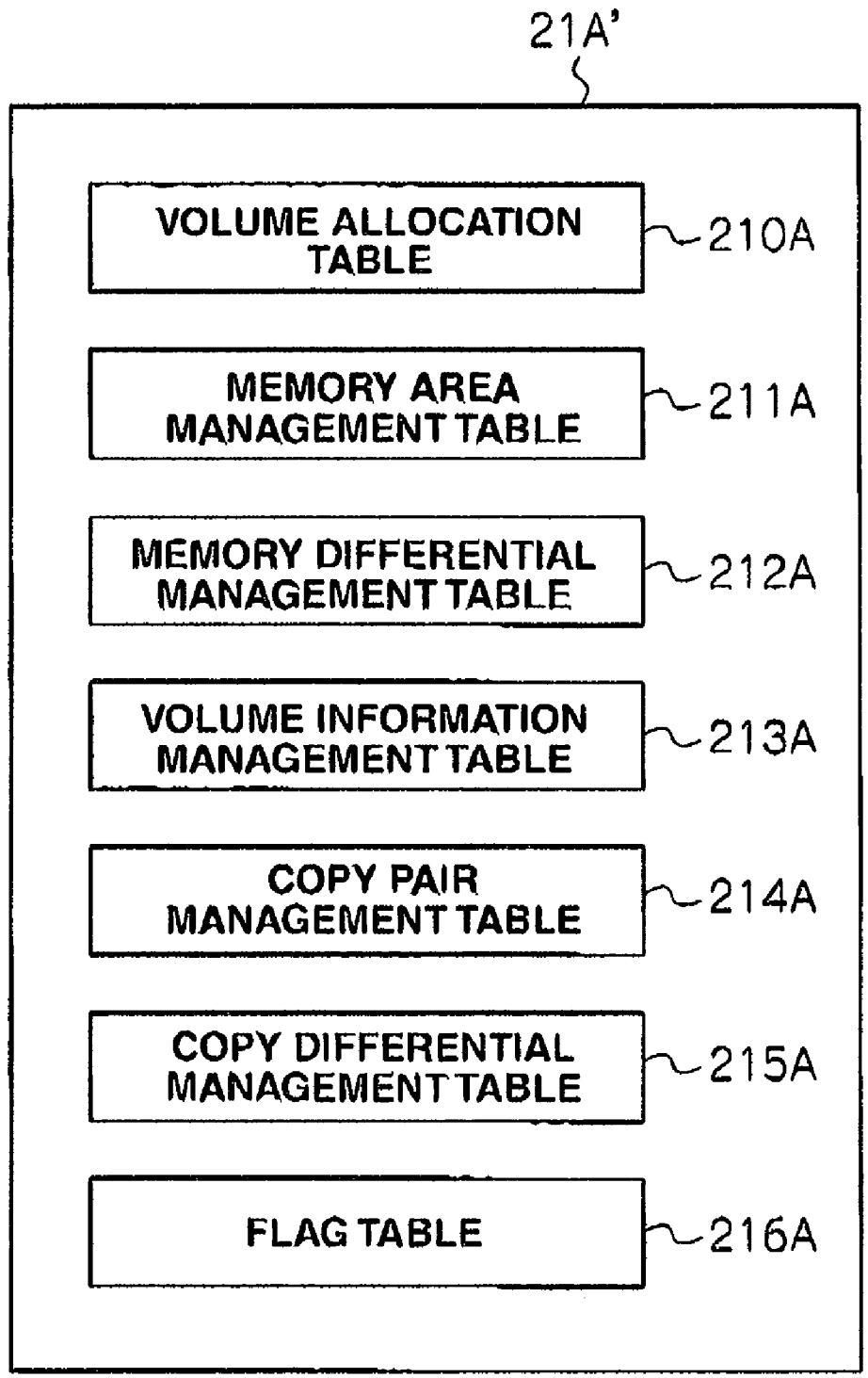
FIG. 27 is a chart showing the contents of a main memory according to the second embodiment.

The copy process 816 is used for copying data between the volumes 60A, 60B of the storage apparatuses 5A, 5B and, as shown in FIG. 27, includes a copy pair management table 214 and a copy differential management table 215 described later.

As a result of the copy process executing data copy and differential data, data migration is consequently concluded.

The remote device file 818 is a special file for remotely recognizing the volume 60B connected to the migration destination virtual server 2B'.

The differential management volume device file 817 is a device file for notifying to the copy process 816 the address of the differential data updated pursuant to the I/O request issued from the application AP of the guest OS 80A even during the data copy (data migration), and comprises a differential management volume block device (not shown) and a device driver (not shown).

Since the virtual computer system 100 comprises the copy process 816 and the differential management volume device file 817, the migration source virtual server 2A explained in the first embodiment is newly indicated as a migration source virtual server 2A', and the migration destination virtual server 2B explained in the first embodiment is newly indicated as a migration destination virtual server 2B'. In addition, the configuration that is the same as the various configurations explained in the first embodiment among the various configurations in the virtual server 2A' and the virtual server 2B' are given the same reference numeral in the ensuing explanation.

In the second embodiment, the I/O outgoing process 810A' that sends data for sending and receiving data between the migration source virtual server 2A' and the migration destination virtual server 2B' is provided in the migration source virtual server 2A'. Meanwhile, the I/O incoming process 810B' that receives data for sending and received data between the migration source virtual server 2A' and the migration destination virtual server 2B' is provided to the migration destination virtual server 2B'.

The virtual computer system 100 according to the present embodiment is configured by the respective virtual servers 2A', 2B' being connected to separate storage apparatuses 5A, 5B via separate SANs 4A, 4B. Thus, the virtual servers 2A', 2B' are in an environment of not being able to share the volumes 60A, 60B formed in the storage apparatuses 5A, 5B connected to the respective virtual servers 2A', 2B'. The invention of this embodiment is characterized in executing migration (live migration) between the virtual servers 2A', 2B' after executing data migration between the volumes 60A, 60B of the storage apparatuses 5A, 5B under the foregoing environment.

The second embodiment explains a case of migrating the data in the volume 60A of the storage apparatus 5A connected to the migration destination virtual server 2B explained in the first embodiment to the volume 60B of the storage apparatus 5B. With respect to live migration, a case is explained of migrating the guest OS 80A in the virtual server 2A' to the virtual server 2B' as with the first embodiment.

(2-2) Various Table Configurations (2-2-1) Copy Pair Management Table

The copy pair management table 214, as shown in FIG. 28, is a table for managing the correspondence of the volume of the data copy destination, and the differential management volume storing the differential data being updated even during the data copy to a specified volume, and is retained in the copy process 816. The copy pair management table 214 is configured from a "copy pair management number" column 2140 to become the management number upon copying differential data, a "copy destination volume name" column 2141 showing the volume name recognized by the management OS 81B' of the migration destination virtual server 2B', and a "copy source volume name" column 2142 showing the differential management volume name storing the differential data recognized by the management OS 81A of the migration source virtual server 2A' and stored in the copy destination volume.

(2-2-2) Copy Differential Management Table

The copy differential management table 215, as shown in FIG. 29, is a table for managing the differential data being updated even during the data copy to a specified volume, and is retained in the copy process 816. The copy differential management table 215 is configured from a "copy pair management number" column 2150, a "serial number" column 2151 showing the processing order of differential data, and a "top block address" column 2152 showing the top block address of the copy source volume 60A in which differential data was generated.

For example, when there is a pair relationship between the volume 5 managed with the copy pair management number of 0001 and the device file 817 of the differential management volume 1, the copy process 816 reads differential data from the volume 60A based on the top block address updated according to the serial number order, and sends this to the I/O outgoing process 810A'. When the I/O outgoing process 810A' thereafter sends the differential data to the volume 5 recognized by the management OS 81B' of the migration destination virtual server 2B', the I/O incoming process 810B' writes the differential data into the volume 60B corresponding to the volume 5.

(2-2-3) Flag Table

The flag table 216, as shown in FIG. 30, is a table required for the copy process 816 to execute data copy and differential data copy, and is retained in the main memory 21.

The flag table 216 is configured from an "I/O retention command flag" column 2160, a "volume switch command flag" column 2161, a "timeout flag" column 2162, and a "volume switched flag" column 2162.

The I/O retention command flag is a flag for the copy process 816 to command the copy source volume 60A to retain the I/O of differential data, and the flag of "1" is raised when a retention command is issued.

The volume switch command flag is a flag showing a command for switching the I/O target from the copy source volume 60A to the copy destination volume 60B, and the flag of "1" is raised when a switch command is issued.

The timeout flag is a flag for the copy source volume 60A to show the copy process 816 that the retention time of the differential data I/O will become timeout, and a flag of "1" is raised in the case of a timeout.

The volume switched flag is a flag for notifying the copy process that the switching of the I/O target from the copy source volume 60A to the copy destination volume 60B was successful, and a flag of "1" is raised in the case of success.

(2-3) Data Migration Processing

The method of migrating the data in the volume 60A of the storage apparatus 5A to the volume 60B of the storage apparatus 5B based on the foregoing software configuration and table configuration is now explained.

(2-3-1) Volume Recognition Processing

Foremost, as the advance preparation for executing data migration, it is necessary to set a common volume 60B that can be recognized (identified) by the virtual server 2A' and the virtual server 2B'.

Upon recognizing the common volume 60B, the volume 60A was commonly recognized in the first embodiment by the I/O outgoing process 810B of the migration destination virtual server 2B accessing the I/O incoming process 810A in the migration source virtual server 2A. The second embodiment explains a case where the volume 60B is commonly recognized by the I/O outgoing process 810A of the migration source virtual server 2A' accessing the I/O incoming process 810B' in the migration destination virtual server 2B'.

Figure 31:
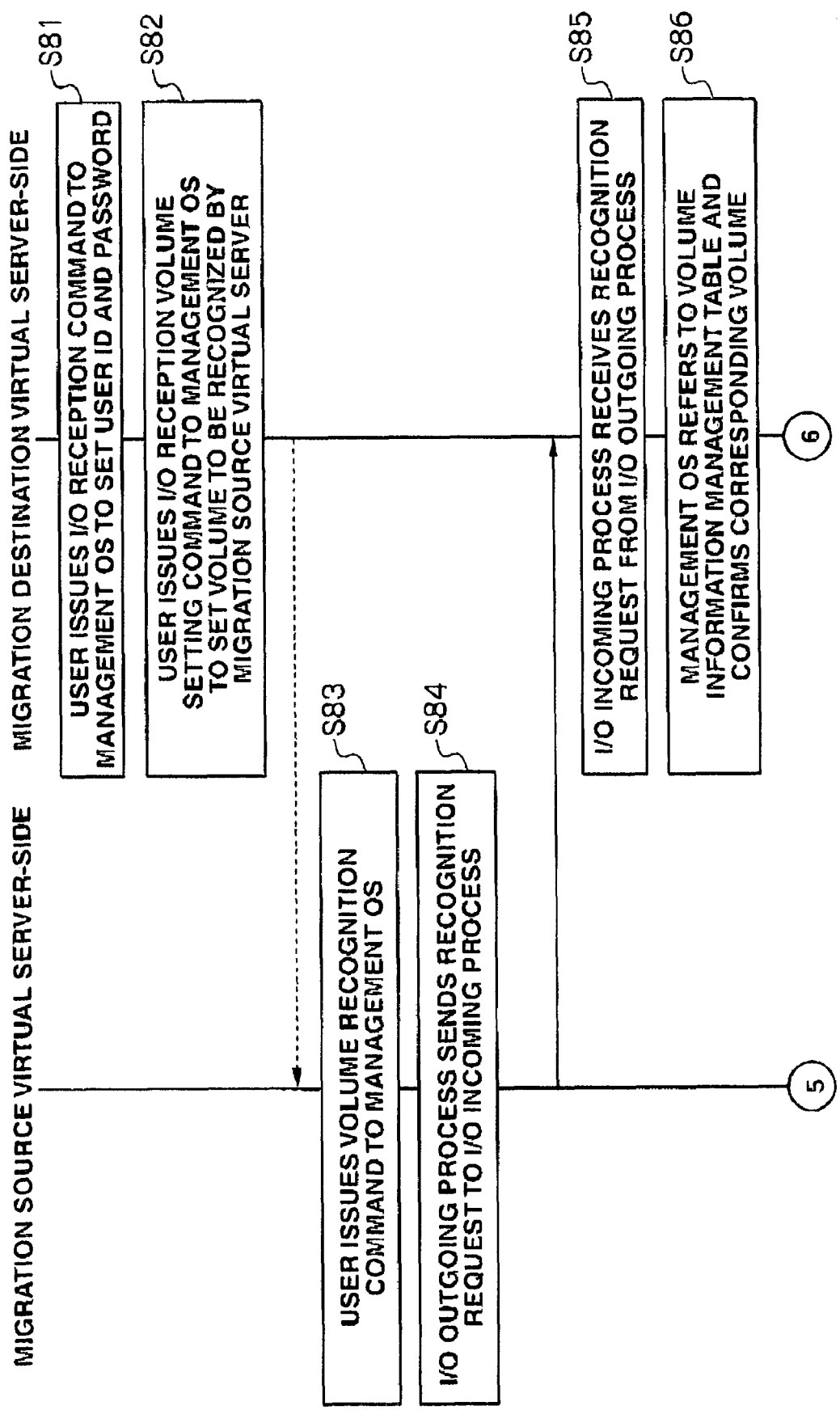
FIG. 31 is a flowchart showing volume recognition processing according to the second embodiment.
Figure 32:
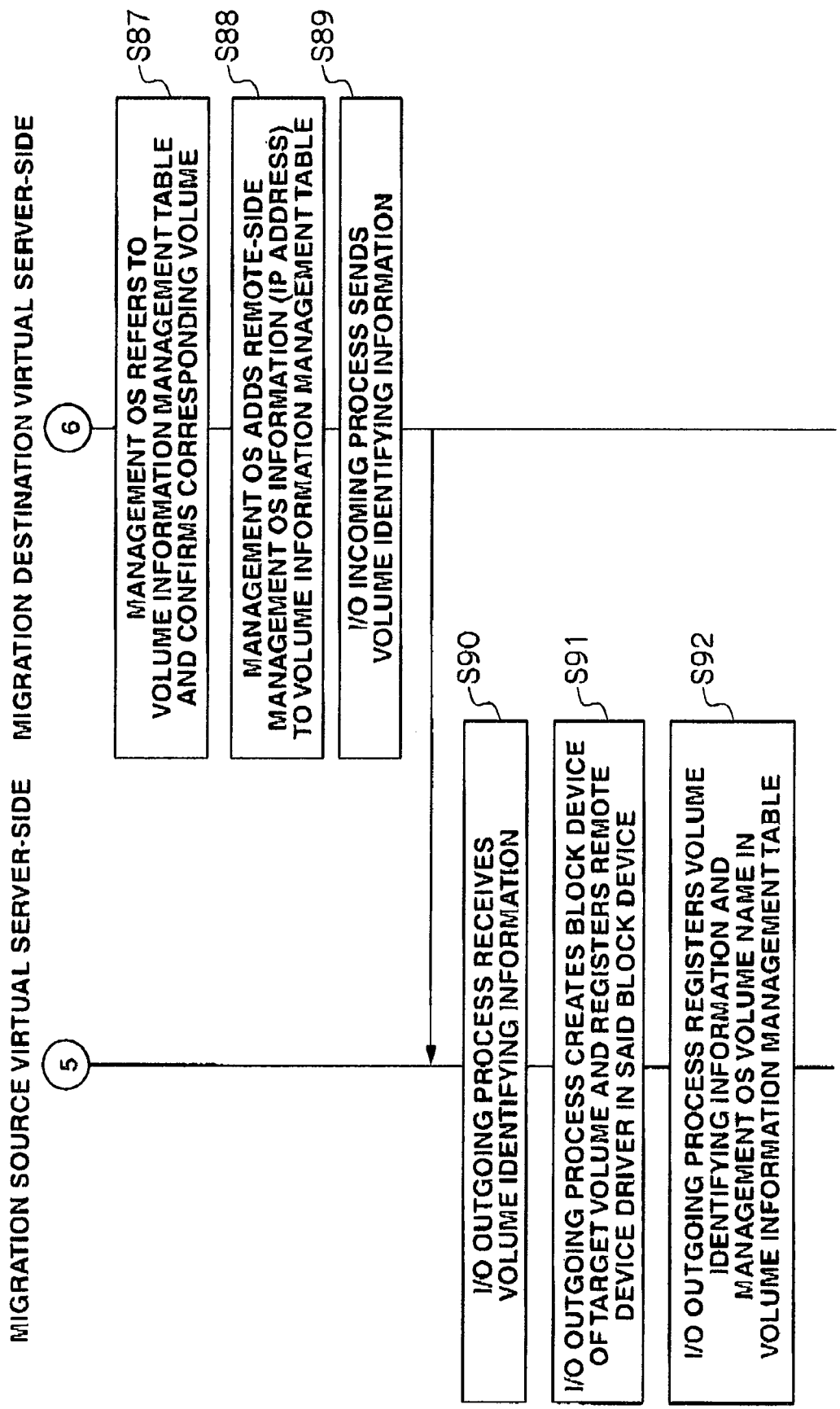
FIG. 32 is a flowchart showing volume recognition processing according to the second embodiment.

Specifically, as shown in FIG. 31 and FIG. 32, the user uses the information I/O devices 26B, 27B to issue an I/O incoming setting command to the management OS 81B'. The detailed explanation of the I/O incoming setting command is omitted since it has been explained in the first embodiment. The user sets the user ID and the password to be used for authentication when connection is requested from the management OS 81A' of the virtual server 2A' in the management OS 81B' of the virtual server 2B (S81). The set information is retained in the I/O incoming process 810B'.

Subsequently, the user issues an I/O incoming volume setting command to the management OS 81B', and sets which volume 60B among the volumes 60B recognized by the management OS 81B' is to also be recognized by the management OS 81A' of the virtual server 2A' (S82). The detailed explanation concerning the contents of the I/O incoming volume setting command is omitted since the contents have been explained in the first embodiment. The set information is retained in the volume information management table 213B of the I/O incoming process 810B'. The process up to this point completes the advance preparation.

The user thereafter issues a volume recognition command at an arbitrary timing to the management OS 81A' of the virtual server 2A' (S83). The detailed explanation concerning the contents of the volume recognition command is omitted since the contents have been explained in the first embodiment.

When the I/O outgoing process 810A' receives the volume recognition command, it sends the command as a recognition request to the I/O incoming process 810B' (S84).

When the I/O incoming process 810B' receives the recognition request, it confirms the user ID and the password, and completes the login (S85).

The management OS 81B' selects one volume 60B to be recognized by the virtual server 2A' from the volume information management table 213B, and confirms whether the virtual server 2A' is able to access the selected volume 60B (S86). If the selected volume is accessible, the management OS 81B' registers the IP address showing the management OS 81A' in the volume information management table 213B (S87).

Here, for example, let it be assumed that the management OS 81B' specifies the volume 80B having the volume identifying information "01:20:01" as the accessible volume 60B from the volume information management table 213B. The management OS 81B' specifies the target volume 60B as the volume 31 recognized by the management OS 81B'.

The I/O incoming process 810B' thereafter sends the volume identifying information of the volume 60B selected from the volume information management table 213B to the I/O outgoing process 810A' (S88).

When the I/O outgoing process 810A' receives the volume identifying information (S89), it creates a device file 819A of the target volume recognized by the migration destination virtual server 2B'. The device file 819A can be created by registering the block device and registering the device driver in the block device (S90).

Specifically, since the volume identifying information of the volume 31 is sent from the I/O incoming process 810B', when the I/O outgoing process 810A' sets the volume 31 as the volume 5 recognized by the management OS 81A', it creates a device file 814A for the volume 5. Thereby, the migration source virtual server 2A' is able to remotely recognize the volume recognized by the migration destination virtual server 2B'.

The I/O outgoing process 810A' registers the received volume identifying information in the volume information management table 213A of the I/O outgoing process 810A', and also registers the volume name recognized by the management OS 81A' based on the received volume identifying information. The block device (not shown) is created according to the number of target volumes, and the remote volume driver (not shown) is registered in the block device 8140B according to the number of volumes (S91). For example, the management OS 81A' registers the target volume name as the volume 5.

The I/O outgoing process 810A' registers the correspondence of the volume identifying information and the volume name connected to the migration destination virtual server 2B' recognized by the management OS 81A' in the volume information management table 213A (S92). For example, the I/O outgoing process 810A' register the volume 5 and the volume identifying information "01:20:01" in the volume information management table 213A.

Figure 33:
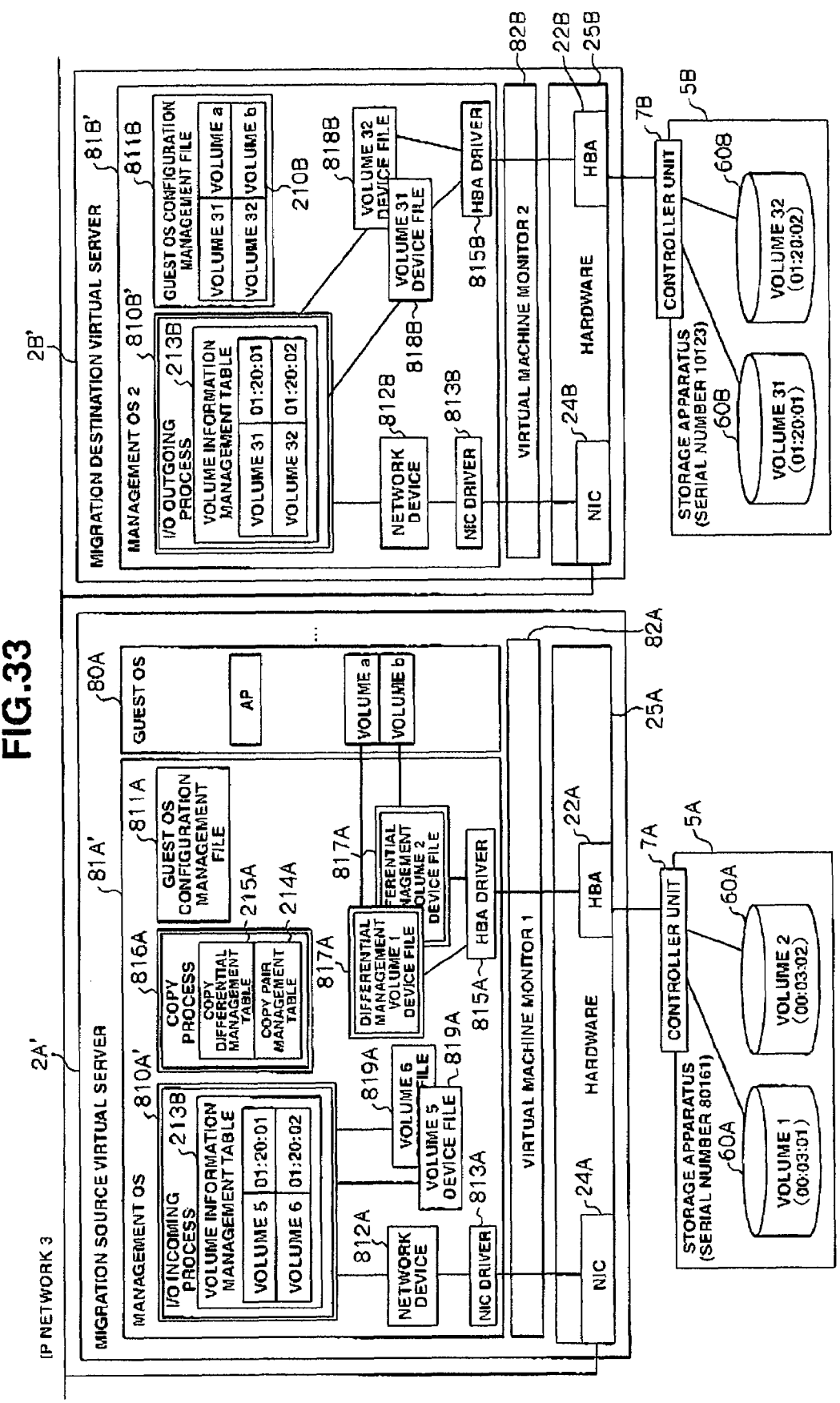
FIG. 33 is a block diagram explaining volume recognition processing according to the second embodiment.

The situation after the execution of the volume recognition processing is shown in FIG. 33. The migration source virtual server 2A and the migration destination virtual server 2B' are able to commonly recognize the volume 60B of the storage apparatus 5B. Like this, the virtual servers 2A, 2B' end the volume recognition processing.

(2-3-2) Data Initial Copy Processing

Data initial copy processing for managing the data and differential data in the volume 60A to be subject to data migration in the migration source virtual server 2A', and ultimately sending all data to the migration destination virtual server 2B' is now explained.

Figure 34:
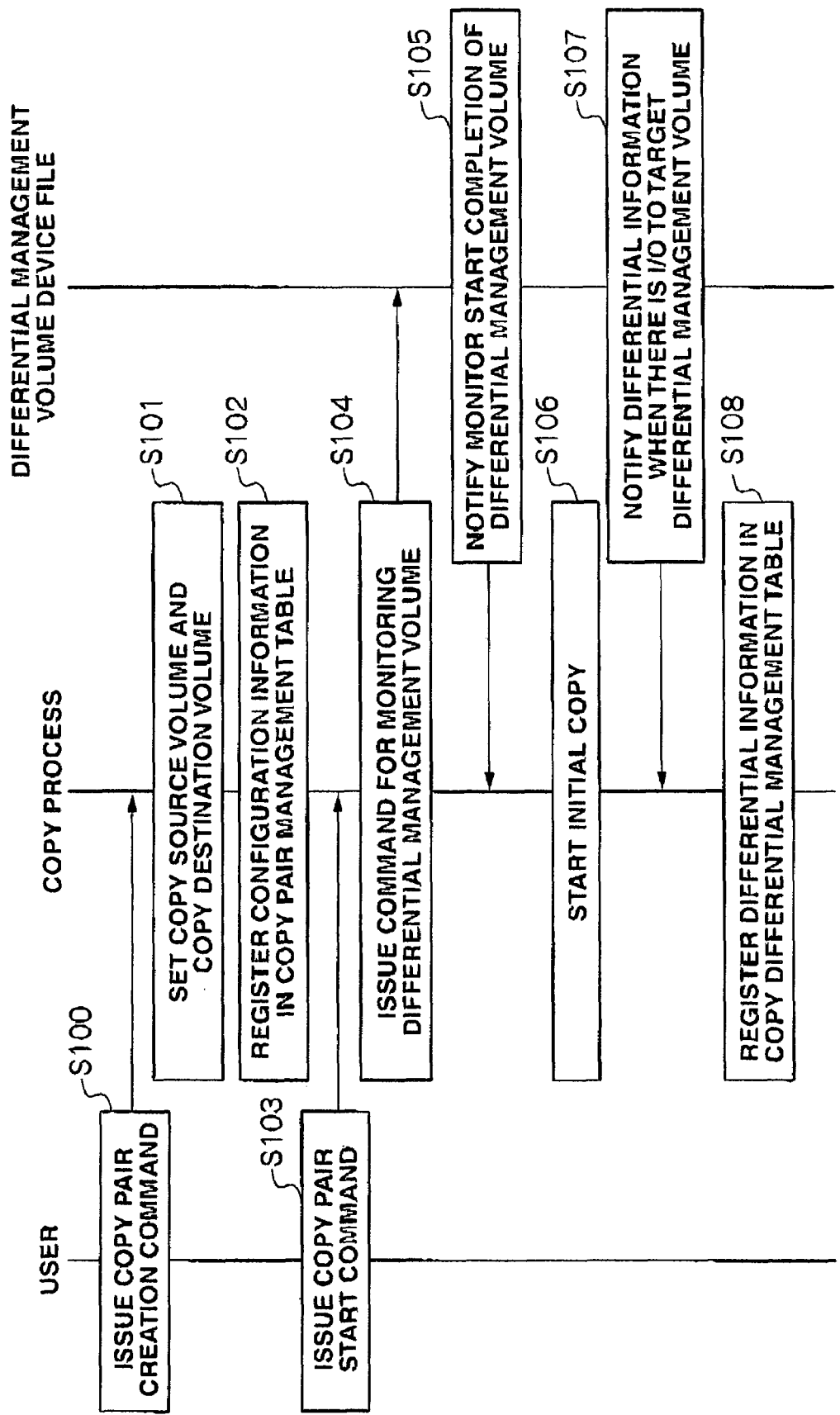
FIG. 34 is a flowchart showing data initial copy processing according to the second embodiment.

Foremost, as shown in FIG. 34, when the user issues a copy pair creation command (S100), the copy process 816A of the migration source virtual server 2A' sets the copy source volume and the copy destination volume for managing the differential data (S101).

For example, the copy process 816A sets "00:03:01" as the volume identifying information of the copy source volume 60A, and sets the volume 5 (volume 60B connected to the migration destination virtual server 2B' and volume name recognized by the management OS 81A') as the copy destination volume. Then, the copy process 816A sets the device file 817A of the differential management volume 1 and the device file 819A of the copy destination volume 5 as the device file for managing the copy source differential data.

The copy pair creation command is a command for setting two volumes for executing copy with the copy process, and is configured from a command name as the copy pair creation command, and copy pair management number, copy source volume name and copy destination volume name as information required for executing the foregoing command.

The set information is registered by the copy process 816A in the copy pair management table 214A (S102).

The user issues a copy start command to the copy process 816A (S103). The copy start command is a command for staring the copy of a pair configured based on the copy pair creation command, and is configured from a command name as the copy start command, and a copy pair management number as information required for executing the foregoing command.

When the copy process 816A receives the copy start command, the copy process 816A commands the target differential management volume device file 817A to monitor whether differential data is generated in the copy source volume 60A (S104).

The differential management volume device file 817A notifies the monitor start completion to the copy process 816A when it enters a status of monitoring the volume 60A of the volume identifying information "00:03.01" according to the foregoing command (S105).

When the copy process 816A receives the monitor start completion, it starts the initial copy (S106).

Specifically, the copy process 816A sends data of the copy source volume 60A to the volume 5 device file 819A. When the device file 819A of the volume 5 thereafter sends the data to the I/O outgoing process 810A', the I/O outgoing process 810A that received the data sends such data to the I/O incoming process 810B' via the IP network 3. The data copy of data received by the I/O incoming process 810B' to the copy destination volume 31 is thereby started.

Figure 35:
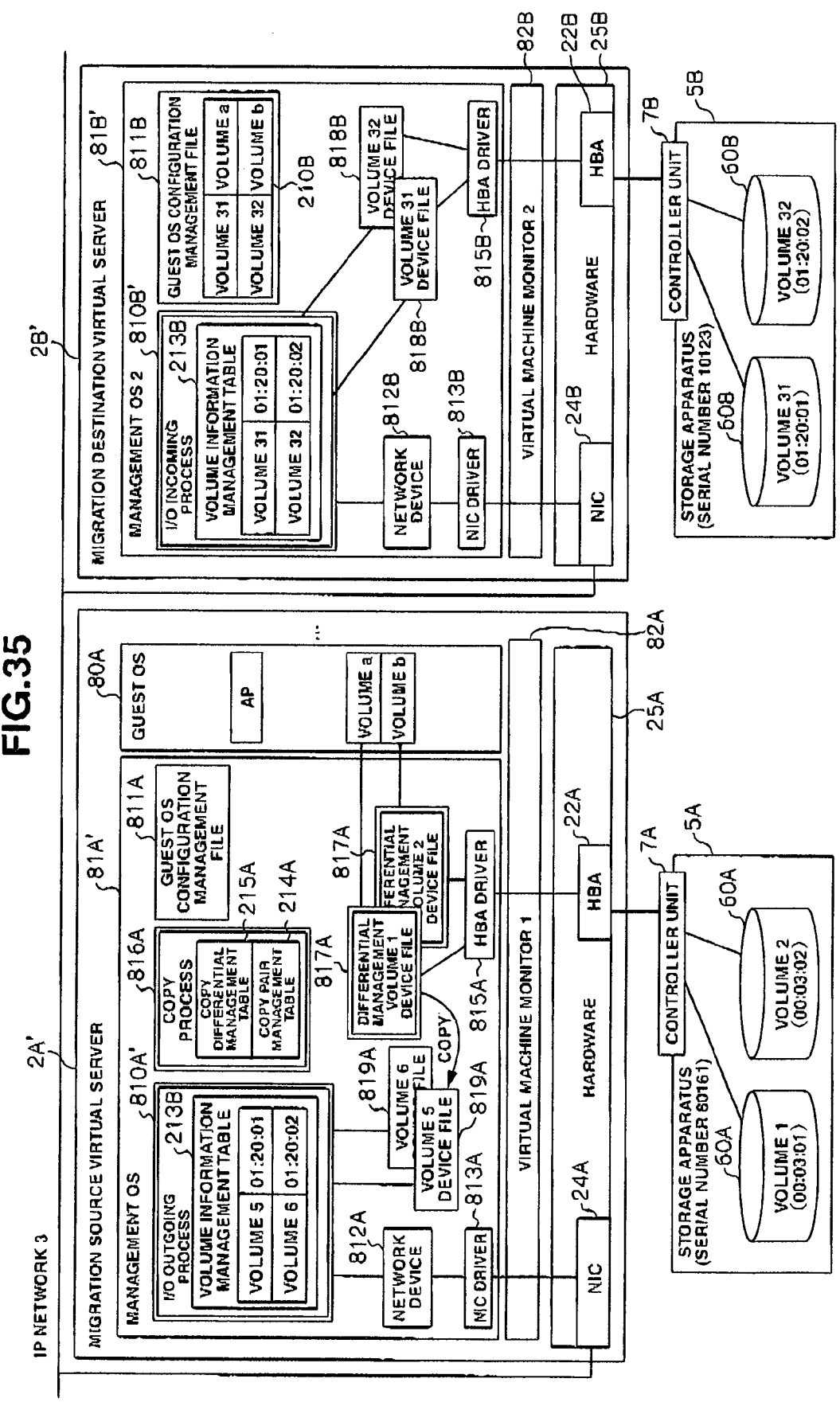
FIG. 35 is a block diagram explaining data initial copy processing according to the second embodiment.

FIG. 35 shows a situation where copy is being executed between the migration source virtual server 2A and the migration destination virtual server 2B'. It is desirable that the user selects a volume in which the copy source and the copy destination volume are of the same capacity.

Subsequently, when data is written (I/O) into the target copy source volume 60A, the differential management volume device file 817A notifies the volume name and the top block address storing the differential data as differential information to the copy process 816A (S107).

When the copy process 816A receives the differential information, it registers this information in the copy differential management table 215A (S108), and then ends the data initial copy processing.

(2-3-3) Copy Process-Side Data Copy Processing

Data copy processing of how the copy process 816A of the migration source virtual server 2A' that completed the initial copy will subsequently manage the differential data is now explained.

Figure 36:
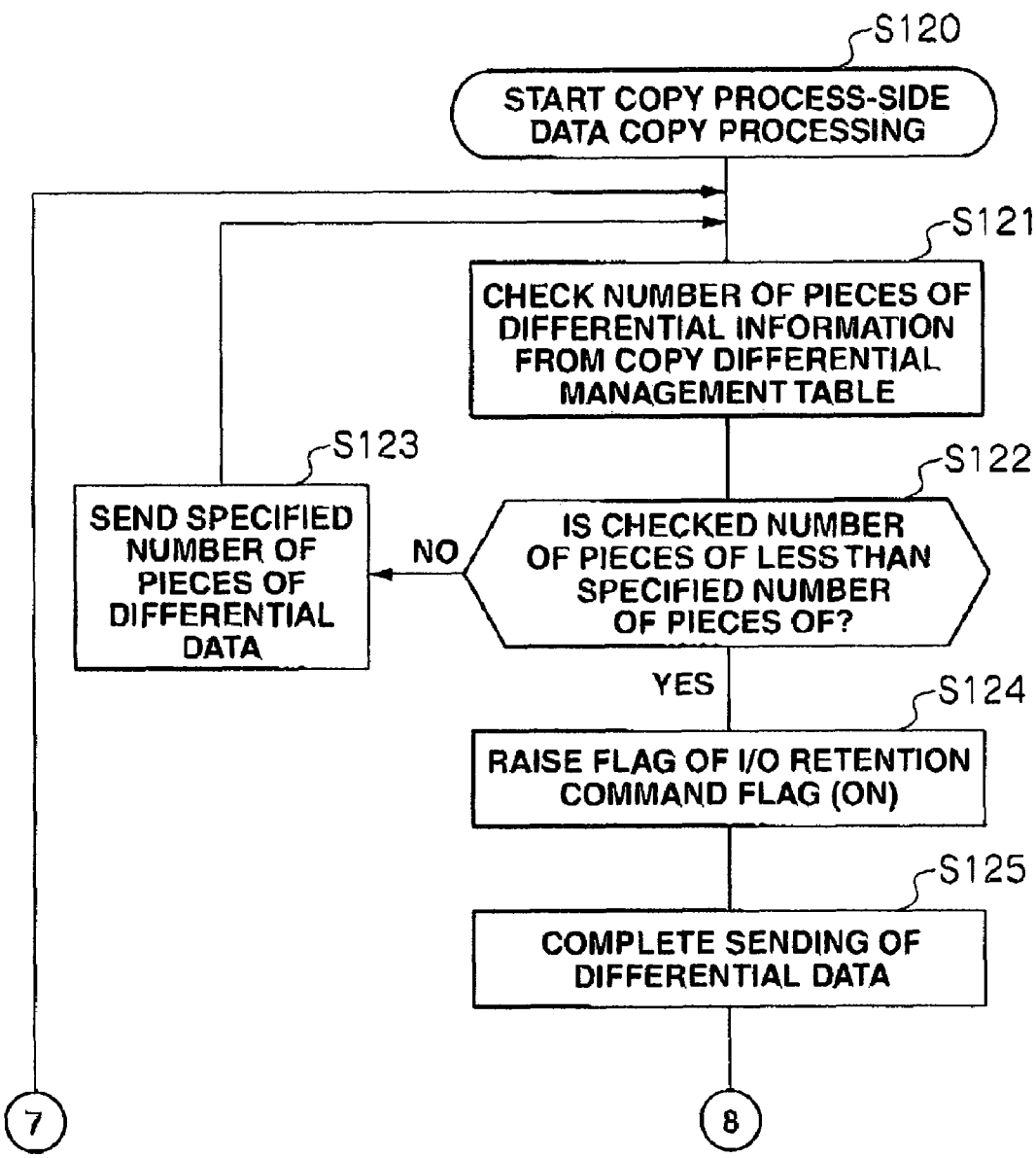
FIG. 36 is a flowchart showing copy process-side data copy processing according to the second embodiment.
Figure 37:
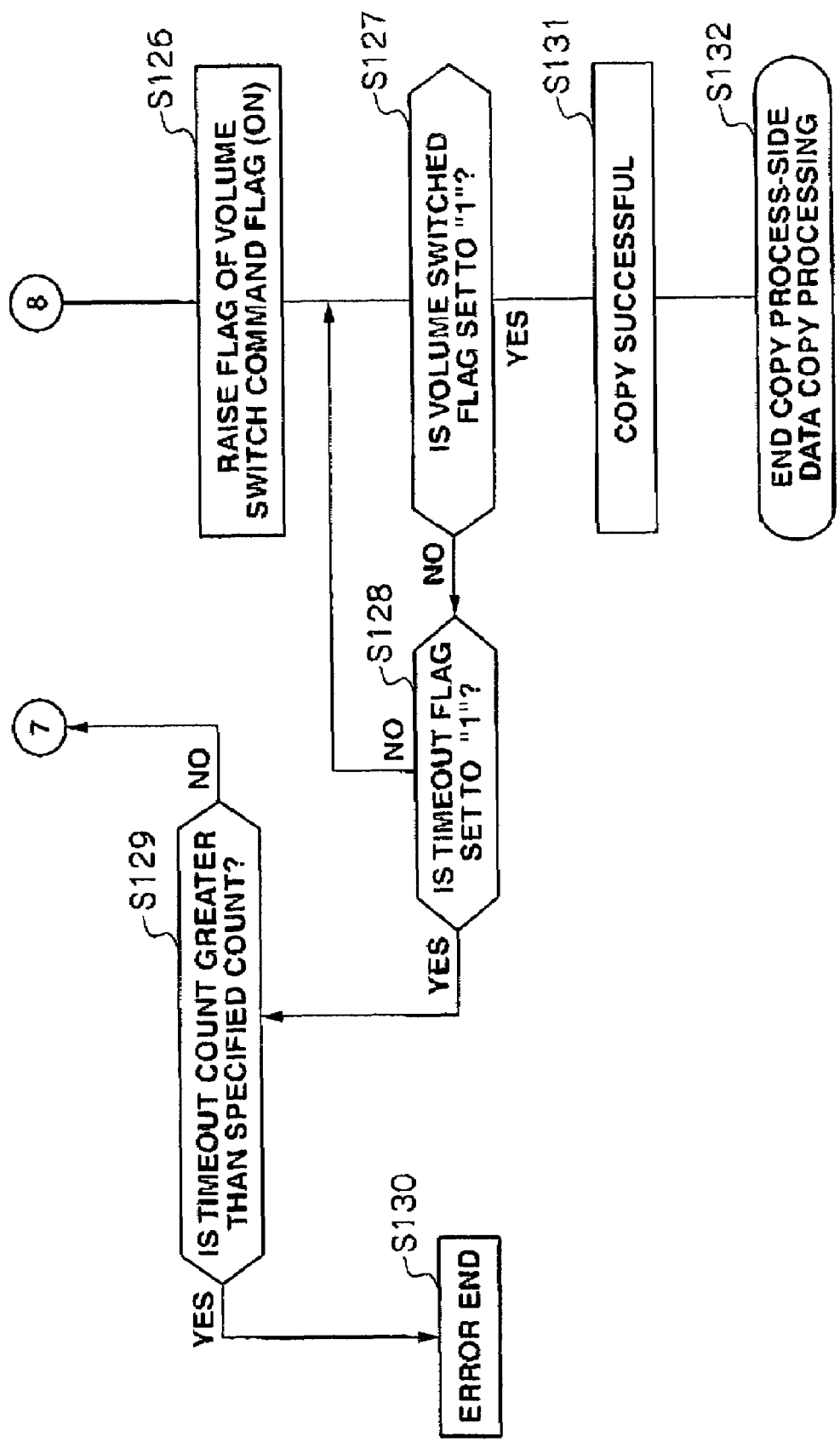
FIG. 37 is a flowchart showing copy process-side data copy processing according to the second embodiment.

As shown in FIG. 36 and FIG. 37, when the copy process 816A ends the data initial copy processing, it subsequently starts the data copy processing (S120). The copy process 816A starts the processing for copying the differential data to the target volume of the migration destination virtual server 2B'.

The copy process 816A checks the number of pieces of differential information concerning the differential data registered in the copy differential management table 215A (S121), and determines whether the number of pieces of registered differential information is less than the pre-set specified number of pieces of differential information (S122). Number of pieces is the number of blocks when the inside of the copy source volume 60A is managed in block units, and, for example, a specified number of pieces is set to 1000 blocks.

If the number of pieces of registered differential information is greater than the pre-set specified number of pieces of differential information (S122: NO), the copy process 816A sends the differential data in the specified number of pieces to the device driver 819A of the volume 5 of the pair target (S123), and once again returns to step S121.

Meanwhile, if the number of pieces of registered differential information is less than the pre-set specified number of pieces of differential information (S122: YES), the copy process 816A raises the flag of the I/O retention command flag column 2160 since this means that the few differential data is accumulated in the migration source virtual server 2A', and sets the status to a temporarily unreceivable status of the copy source volume 60A (S124).

In this unreceivable status, the copy process 816A sends the differential data to the device driver 819A of the pair target volume 5 (S125).

When the copy process 816A commands the differential management volume device file 817A to switch the copy source volume 60A to be subject to differential data I/O to the copy destination volume 60B, it raises the flag of the volume switch command flag column 2161 (S126).

Here, the differential management volume device file 817A switches the connection to the HBA driver 815A to the connection to the device driver 819A of the volume 5. As a result of this switching, the I/O target can be switched from the copy source volume 60A to the copy destination volume 60B.

Subsequently, the copy process 816A checks the flag of the volume switched flag column 2163 for switching the copy source volume 60A to be subject to differential data I/O (S127), and, when the differential management volume device file 817A has not switched to the next target copy source volume 60A (S127: NO), the differential management volume device file 817A determines whether the retention time of the differential data I/O to the copy process 816A is timeout (S128).

When the copy process 816A determines that the timeout flag column 2162 is "0" (S128: NO), since this means that it is not timeout, it issues a volume switch command to the storage apparatus 5A, confirms that the volume has been switched, and raises the flag of the volume switched flag column 2163.

Meanwhile, when the copy process 816A determines that the timeout flag column 2162 is "1" (S128: YES), it determines whether the timeout count is greater than the pre-set specified count (S129), and, if the timeout count is greater than the specified count (S129: YES), it ends in error (S130).

If the timeout count is less than the specified count (S129: NO), the copy process once again executes the processing at step S121.

At step S127, if the flag of the volume switched flag column 2163 for switching the copy source volume 60A to be subject to differential data I/O is "1" (S127: YES), the copy process 816A determines that the copy was successful (S131), and ends this processing (S132).

Subsequently, when the copy process 816A sends data to the volume 5 device file 819A, the volume 5 device file 819A that received the data sends such data to the I/O outgoing process 810A. Then, all data is sent from the I/O outgoing process 810A of the migration source virtual server 2A' to the I/O incoming process 810B of the migration destination virtual server 2B', and copied to the corresponding volume 31.

(2-3-4) Differential Management Volume Device File-Side Data Copy Processing

Data copy processing of how the differential management volume device file of the migration source virtual server 2A' that completed the initial copy subsequently manages the differential data is now explained. The data copy processing of the differential management volume device file 817A is performed in parallel with the foregoing data copy processing of the copy process 816A.

Figure 38:
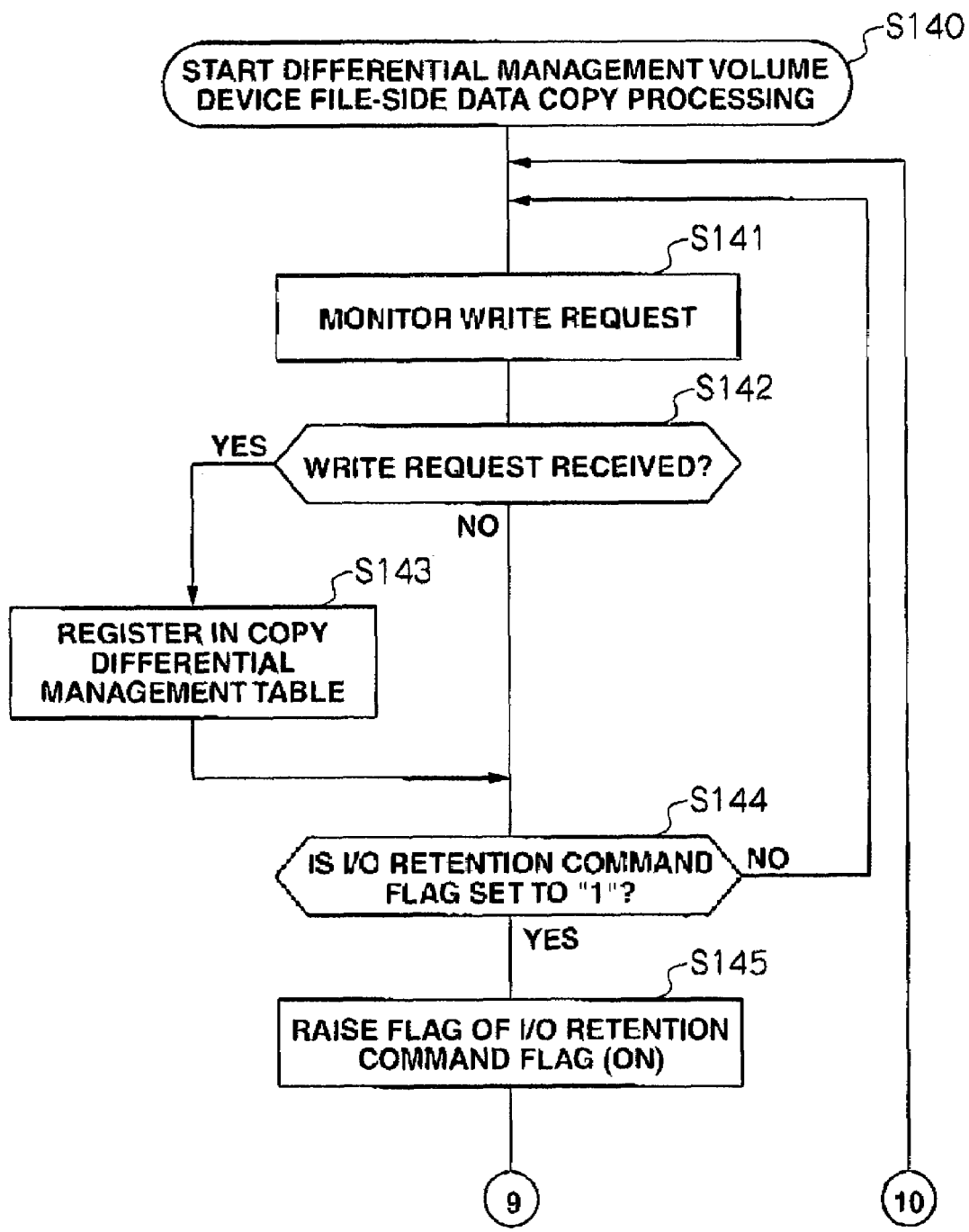
FIG. 38 is a flowchart showing differential management volume device file-side data copy processing according to the second embodiment.
Figure 39:
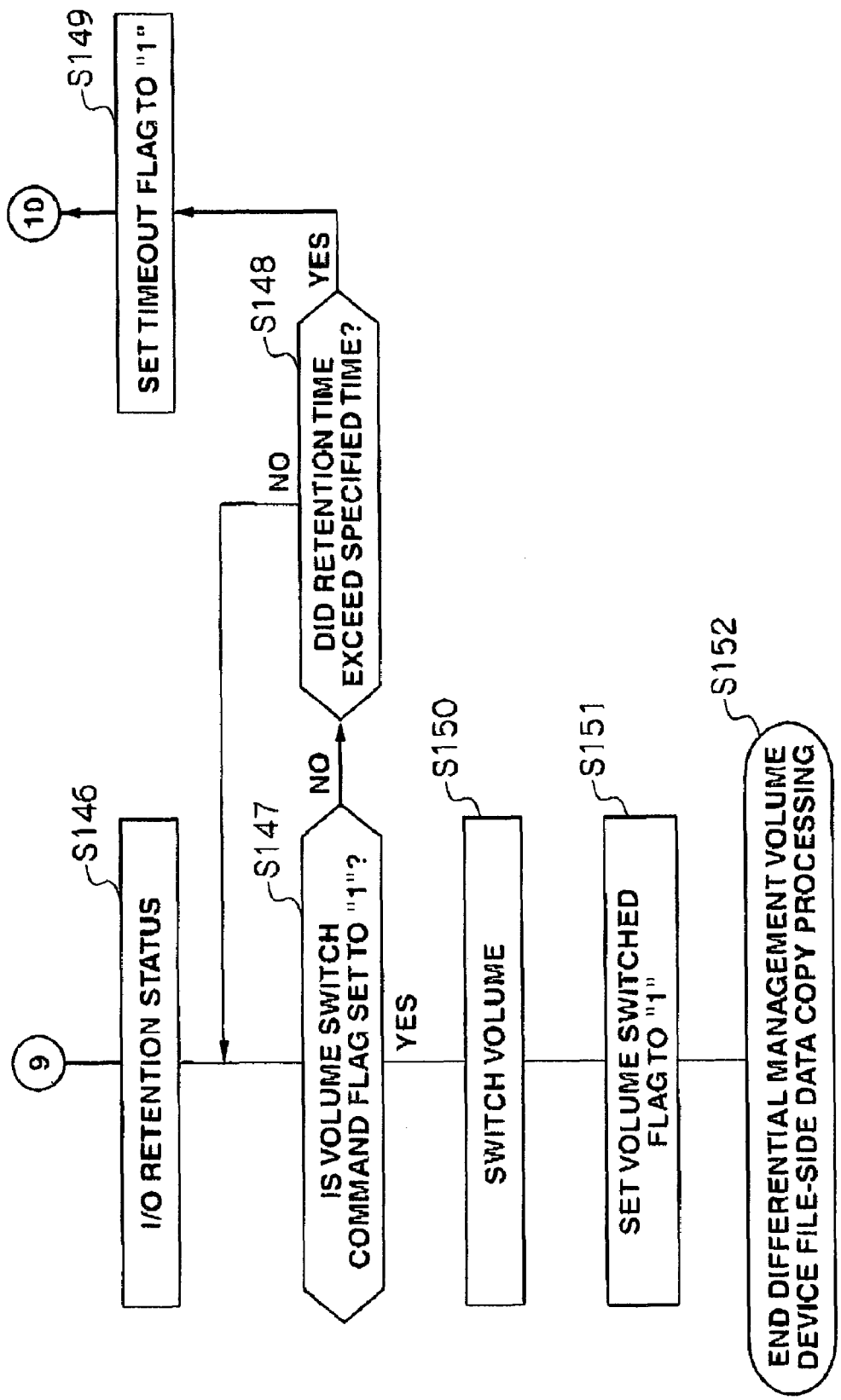
FIG. 39 is a flowchart showing differential management volume device file-side data copy processing according to the second embodiment.

As shown in FIG. 38 and FIG. 39, when the differential management volume device file 817A ends the initial copy, it starts the data copy processing (S140).

Subsequently, the differential management volume device file 817A monitors the write (I/O) request from the guest OS 80A (S141). Since differential data based on the write request will be generated, the differential management volume device file 817A needs to monitor the write (I/O) request.

When the differential management volume device file 817A receives the write (I/O) request from the guest OS 80A (S142: YES), it registers the serial number and the top block address of the differential data in the copy differential management table 215A (S143), and checks the flag of the I/O retention command flag column 2160 (S144).

If the differential management volume device file 817A does not receive a write (I/O) request from the guest OS 80A (S142: NO), it directly checks the I/O retention command flag column 2160 (S144), and returns once again to step S141 if the flag is "0" (S144: NO), and raises the flag of the I/O retention command flag column 2160 if the flag is "1" (S144: YES) (S145).

After the differential management volume device file 817A sets a retention status so that I/O is not performed to the copy source volume 60A (S146), it checks the flag of the volume switch flag column 2161, and determines whether the switch was made to the copy destination volume 60B (S147).

If the differential management volume device file 817A that the switch has not been made to the copy destination volume 60B (S147: NO), it subsequently determines whether the I/O retention time is exceeding a predetermined time (S148).

If the differential management volume device file 817A determines that the I/O retention time is not exceeding a predetermined time (S148: NO), it returns once again to step S147. Contrarily, if the differential management volume device file 817A determines that the I/O retention time is exceeding a predetermined time (S148: YES), it raises the timeout flag (S149), and returns to step S141.

At step S147, if the differential management volume device file 817A determines that the switch was made to the copy destination volume 60B (S147: YES), it performs volume switching by switching the volume to the copy destination volume device file 817A (S150), raises a flag in the volume switched flag column 2163 (S151), and then ends the data copy processing (S152).

Figure 40:
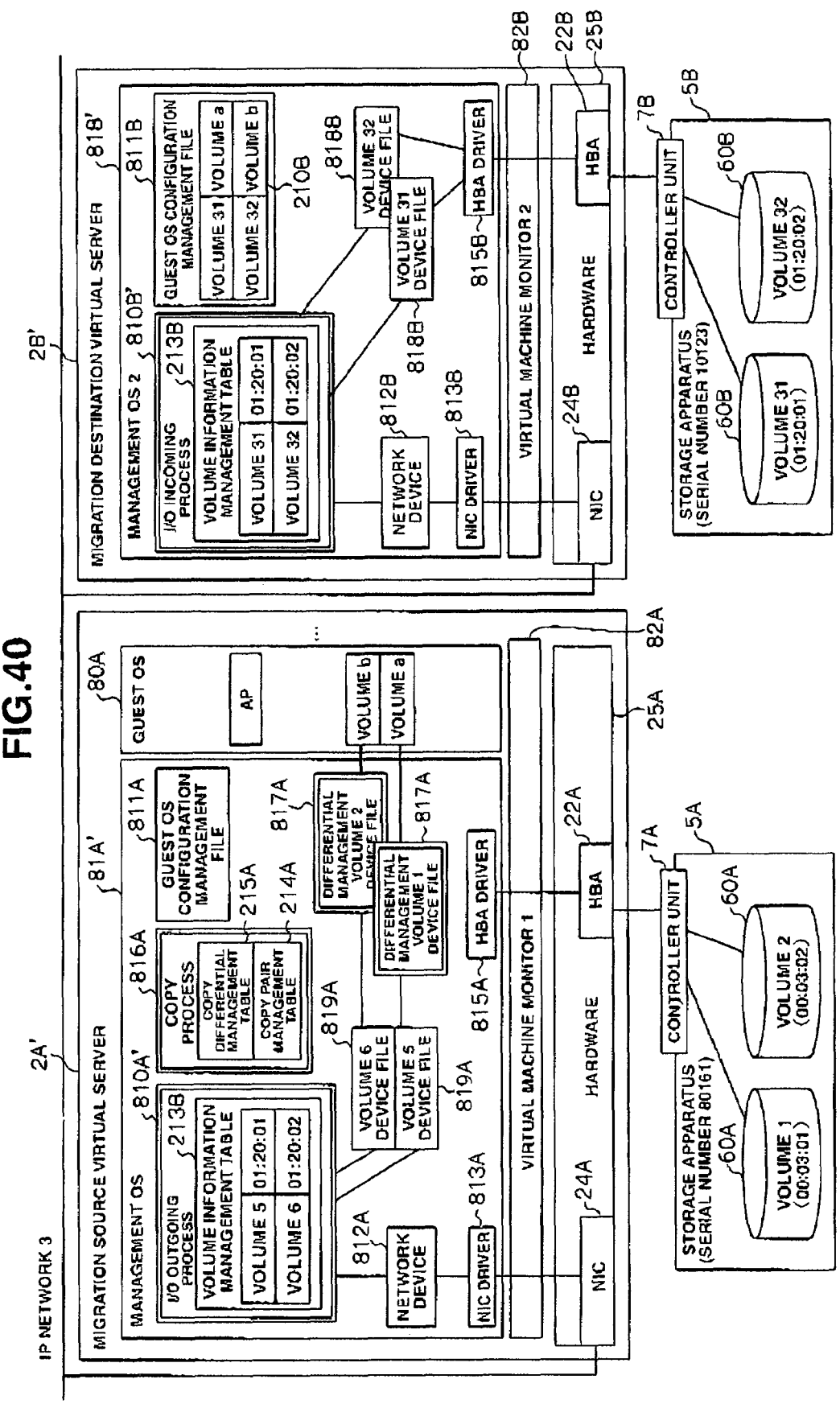
FIG. 40 is an explanatory diagram explaining data copy processing according to the second embodiment.

Data migration is thereby complete. This situation is shown in FIG. 40. FIG. 40 shows a situation where, after the data copy from the copy source volume 60A to the copy destination volume 60B is complete, the copy source volume 60A and the copy destination volume 60B volume are synchronized and the switching of the volume is complete.

(2-4) Live Migration Processing

The method of migrating the guest OS 80 in the migration source virtual server 2A to the migration destination virtual server 2B based on the foregoing software configuration and table configuration after the execution of data migration is now explained.

Figure 41:
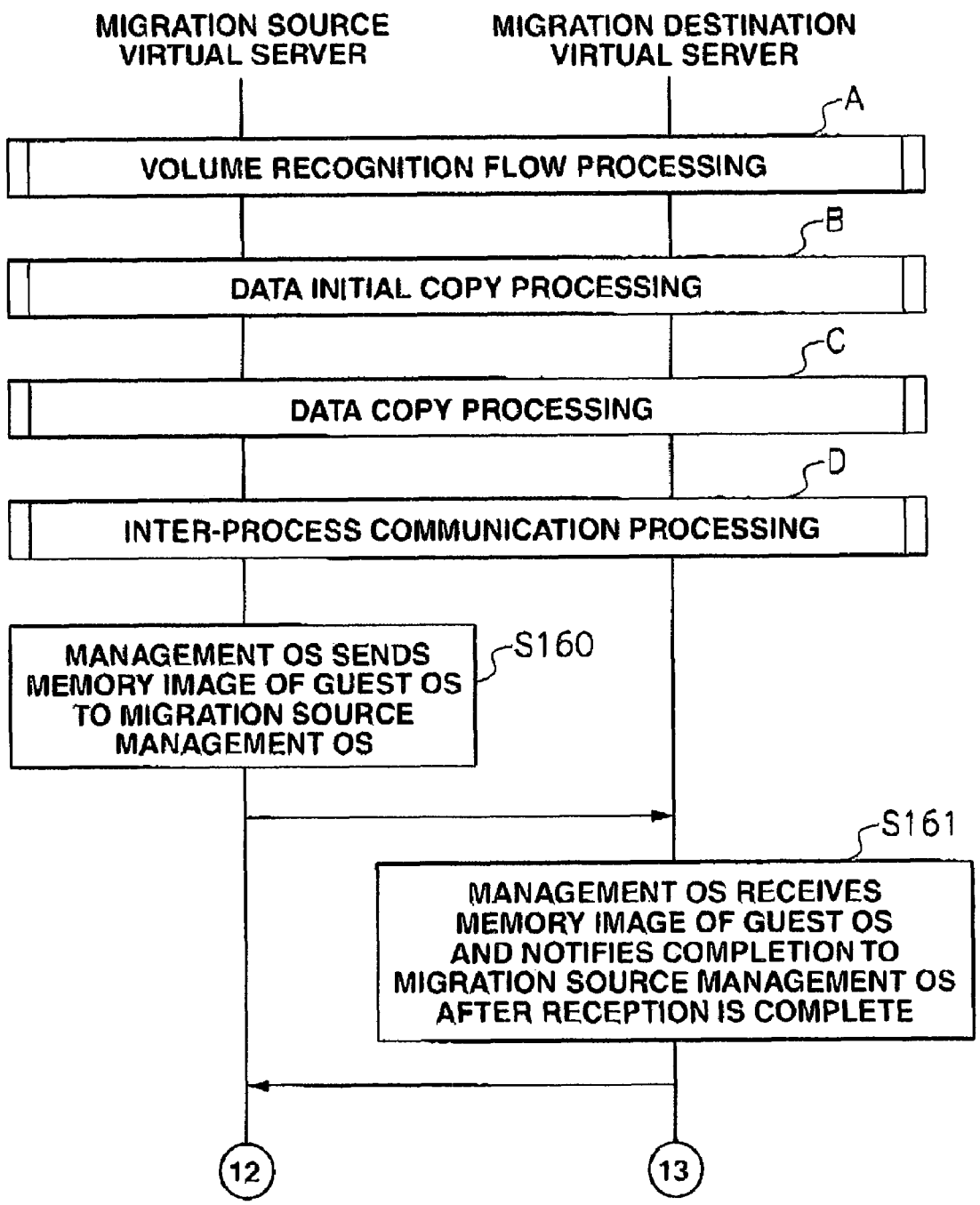
FIG. 41 is a flowchart showing data migration processing according to the second embodiment.
Figure 42:
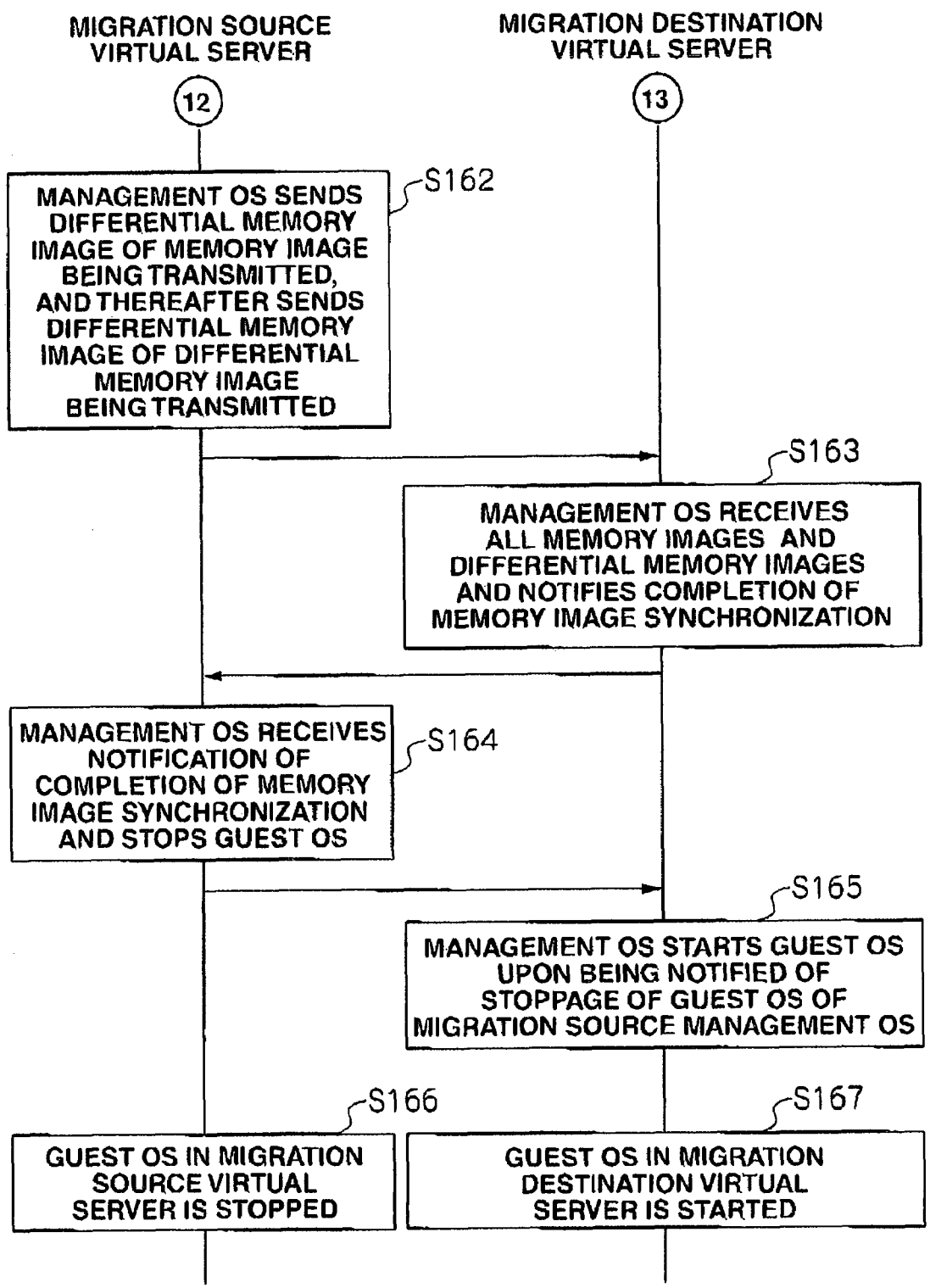
FIG. 42 is a flowchart showing data migration processing according to the second embodiment.

Specifically, as shown in FIG. 41 and FIG. 42, the migration source virtual server 2A' or the migration destination virtual server 2B' recognizes the volume by executing the volume recognition processing A. The volume recognition processing A is the processing from step S81 to step S92 described above.

Subsequently, the migration source virtual server 2A' or the migration destination virtual server 2B' copies the initial data by executing the data initial copy processing B. The data initial copy processing B is the processing from step S100 to step S108 described above.

Subsequently, the migration source virtual server 2A' executes the data copy processing C, copies the differential data being copied to the migration destination virtual server 2B', and switches the volume by synchronizing the migration source virtual server 2A' and the migration destination virtual server 2B'. The data copy processing C is the processing from step S120 to step S132 and the processing from step S140 to step S151.

In addition, when the guest OS 80A issues an I/O request, the migration source virtual server 2A' or the migration destination virtual server 2B' executes the inter-process communication processing D so as to exchange I/O between the I/O incoming/outgoing processes 810. The inter-process communication processing D is the processing from step S30 to step 37.

Figure 43:
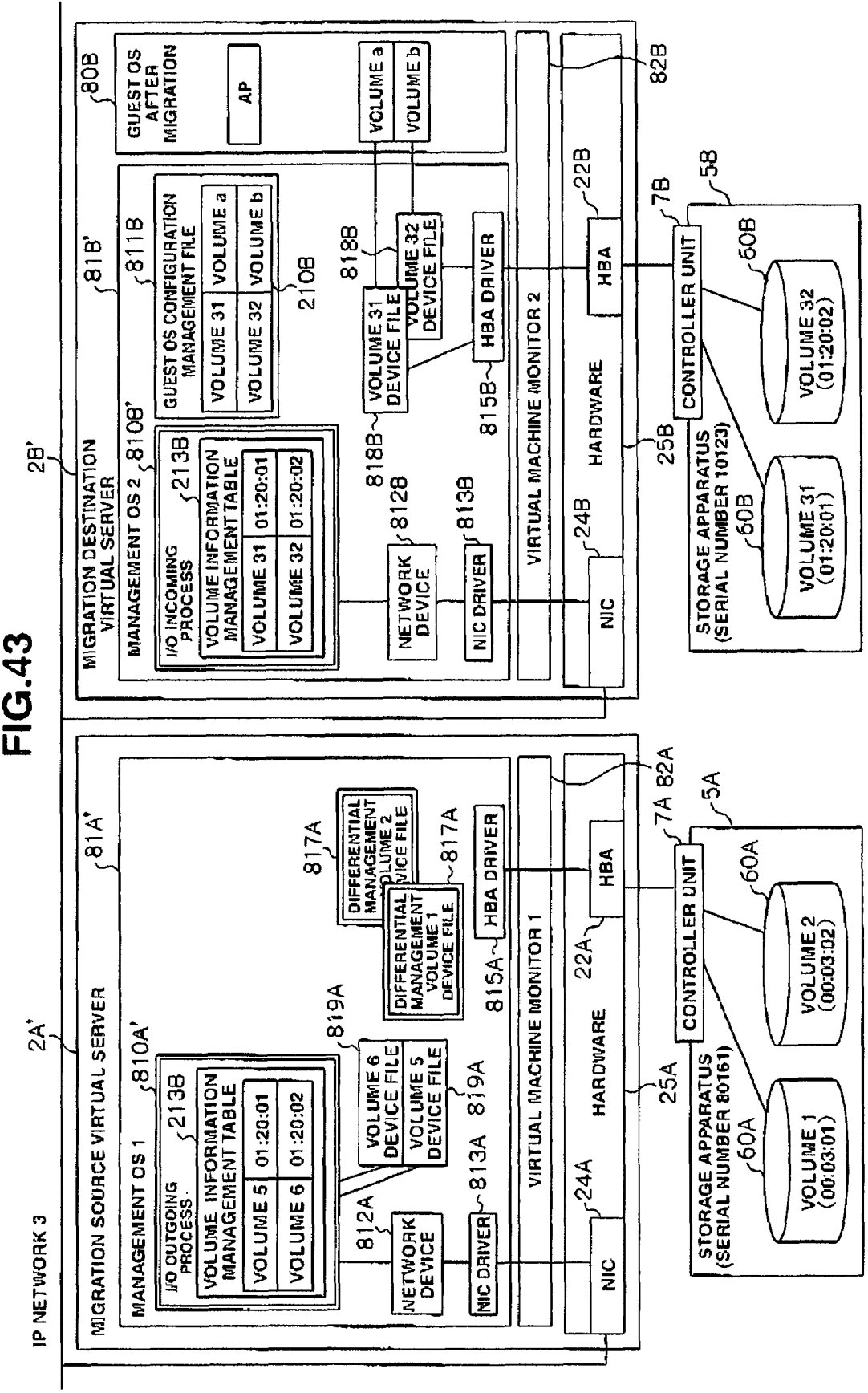
FIG. 43 is a block diagram explaining data migration processing according to the second embodiment.

The migration source virtual server 2A' or the migration destination virtual server 2B' executes the processing from step S160 to step S167 according to the same routine as the processing from step S13 to step S20, and, as shown in FIG. 43, completes the live migration to the migration destination virtual server 2B'.

(2-5) Effect of Second Embodiment

As described above, even in cases where a plurality of virtual servers are not able to share volumes of storage apparatuses, data migration and live migration of the virtual server can be executed.

In addition, after the execution of live migration, I/O processing can be executed to a common volume from the migration destination virtual server that was subject to live migration.

The present invention can be broadly applied to virtual computer systems having one or more storage apparatuses and one or more virtual OSes, as well as virtual computer systems of various other modes.

What is claimed is:

1. A virtual computer system, comprising:
a migration source virtual server comprising a first processor and a first memory;
a migration destination virtual server comprising a second processor and a second memory,
wherein said migration source virtual server and said migration destination virtual server each comprise one or more virtual Operating Systems (OSes) and a management Operating System (OS) for managing said one or more virtual OSes; and
a plurality of storage apparatuses having a plurality of logical volumes provided by a storage area in a hard disk;
wherein said migration source virtual server and said migration destination virtual server are mutually connected via a first network;
wherein said migration source virtual server is connected to said storage apparatus via a second network;
wherein said migration destination virtual server is connected to another storage apparatus via a third network; and
wherein said migration source virtual server and said migration destination virtual server respectively include:
a volume allocation unit for allocating said logical volumes managed by the management OS of said migration source virtual server and the management OS of said migration destination virtual server, and said logical volumes managed by the respective virtual OSes;
a volume information management unit for associating and managing volume identifying information for identifying said logical volumes and said logical volumes managed by the management OS of said migration source virtual server and the management OS of said migration destination virtual server;
an identification unit for said migration source virtual server and said migration destination virtual server to identify the same logical volume as a target logical volume based on said volume identifying information;
a virtual OS migration unit for migrating data in an memory area used by a virtual OS of said migration source virtual server to said migration destination virtual server, and migrating update data in said memory area to be updated during said migration to said migration destination virtual server,
wherein said migration source virtual server further comprises:
a copy pair management unit for pair-configuring and managing a migration destination target logical volume to be managed in said migration source virtual server and connected to said migration destination virtual server, and a migration source target logical volume to be connected to said migration source virtual server;
a copy differential management unit for associating and managing an address of said migration source target logical volume to be updated based on an Input/Output (I/O) request issued by said virtual OS during the migration of data in said migration source target logical volume to said migration destination target logical volume, and said pair configuration; and
a data migration unit for migrating data in said migration source target logical volume to said migration destination target logical volume, and migrating update data stored in said migration source target logical volume to said migration destination target logical volume during said migration.

2. The virtual computer system according to claim 1, wherein with said virtual OS migration unit, either said migration source virtual server or said migration destination virtual server includes an I/O incoming process and the other includes an I/O outgoing process, and said I/O incoming process and said I/O outgoing process send and receive said volume identifying information.

3. The virtual computer system according to claim 1, wherein with said data migration unit, a copy process included respectively in said migration source virtual server and said migration destination virtual server sends and receives said data or said update data with an I/O incoming process included in either said migration source virtual server or said migration destination virtual server and an I/O outgoing processing included in the other.

4. A virtual computer migration control method of a virtual computer system, said virtual computer system comprising:
a migration source virtual server comprising a first processor and a first memory;
a migration destination virtual server comprising a second processor and a second memory,
wherein said migration source virtual server and said migration destination virtual server each comprise having one or more virtual Operating Systems (OSes) and a management Operating System (OS) for managing said one or more virtual OSes; and
a plurality of storage apparatuses having a plurality of logical volumes provided by a storage area in a hard disk;
wherein said migration source virtual server and said migration destination virtual server are mutually connected via a first network;
wherein said migration source virtual server is connected to said storage apparatus via a second network; and
wherein said migration destination virtual server is connected to another storage apparatus via a third network;

said virtual computer migration control method comprising:

a volume allocation step for allocating said logical volumes managed by the management OS of said migration source virtual server and the management OS of said migration destination virtual server and said logical volumes managed by the respective virtual OSes;

a volume information management step for associating and managing volume identifying information for identifying said logical volumes and said logical volumes managed by the management OS of said migration source virtual server and the management OS of said migration destination virtual server;

an identification step for said migration source virtual server and said migration destination virtual server to identify the same logical volume as a target logical volume based on said volume identifying information;

a virtual OS migration step for migrating data in an memory area used by a virtual OS of said migration source virtual server to said migration destination virtual server, and migrating update data in said memory area to be updated during said migration to said migration destination virtual server;

a copy pair management step for pair-configuring and managing a migration destination target logical volume to be managed in said migration source virtual server and connected to said migration destination virtual server, and a migration source target logical volume to be connected to said migration source virtual server;

a copy differential management step for associating and managing an address of said migration source target logical volume to be updated based on an Input/Output (I/O) request issued by said virtual OS during the migration of data in said migration source target logical volume to said migration destination target logical volume, and said pair configuration; and a data migration step for migrating data in said migration source target logical volume to said migration destination target logical volume, and migrating update data stored in said migration source target logical volume to said migration destination target logical volume during said migration.

5. The virtual computer migration control method according to claim 4, wherein, at said virtual OS migration step, either said migration source virtual server or said migration destination virtual server includes an I/O incoming process and the other includes an I/O outgoing process, and said I/O incoming process and said I/O outgoing process send and receive said volume identifying information.

6. The virtual computer migration control method according to claim 4 wherein, at said data migration step, a copy process included respectively in said migration source virtual server and said migration destination virtual server sends and receives said data or said update data with an I/O incoming process included in either said migration source virtual server or said migration destination virtual server and an I/O outgoing processing included in the other.

* * * * *